(12) United States Patent
Yumbe

(10) Patent No.: US 12,159,327 B2
(45) Date of Patent: Dec. 3, 2024

(54) IMAGE PROCESSING APPARATUS, IMAGING APPARATUS, IMAGE PROCESSING METHOD, AND IMAGE PROCESSING PROGRAM

(71) Applicant: FUJIFILM Corporation, Tokyo (JP)

(72) Inventor: Hirona Yumbe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/344,387

(22) Filed: Jun. 29, 2023

(65) Prior Publication Data

US 2023/0342990 A1    Oct. 26, 2023

Related U.S. Application Data

(63) Continuation of application No. 17/008,477, filed on Aug. 31, 2020, now Pat. No. 11,734,859.

(30) Foreign Application Priority Data

Sep. 13, 2019   (JP) .................................. 2019-167365

(51) Int. Cl.
   *G06T 11/00*    (2006.01)
   *G06T 3/20*    (2006.01)
   (Continued)

(52) U.S. Cl.
   CPC .............. *G06T 11/00* (2013.01); *G06T 3/20* (2013.01); *G06T 3/40* (2013.01); *G06T 7/11* (2017.01);
   (Continued)

(58) Field of Classification Search
   CPC ... G06T 11/00; G06T 3/20; G06T 3/40; G06T 7/11; G06T 7/90; G06T 2200/24;
   (Continued)

(56) References Cited

U.S. PATENT DOCUMENTS 4,831,556 A * 5/1989 Oono ................... G06F 3/04855
                                                                                  715/799
2007/0188646 A1 8/2007 Kobayashi et al.
(Continued)

FOREIGN PATENT DOCUMENTS

CN        103413342 A       11/2013
CN        105122306 A       12/2015
(Continued)

OTHER PUBLICATIONS

An Office Action mailed by the Japanese Patent Office on May 24, 2022, which corresponds to Japanese Application No. 2019-167365 with English translation.
(Continued)

*Primary Examiner* — Stephen P Coleman
(74) *Attorney, Agent, or Firm* — Studebaker & Brackett PC

(57) ABSTRACT

A portable terminal includes a display control unit, an extraction unit, and a compositing unit. The display control unit displays a specifying frame for specifying a specified region which is a partial region in a display image displayed on a touch panel display, and a color designation mark for designating a reference color from colors included in an image of the specified region in the specifying frame, in superposition with the display image. The extraction unit extracts an image corresponding to the reference color designated by the color designation mark from the image of the specified region in the specifying frame, as a compositing target image. The compositing unit generates a composite image in which the compositing target image is composited in a selection image selected by a user.

17 Claims, 28 Drawing Sheets

(51) Int. Cl.
*G06T 3/40* (2006.01)
*G06T 7/11* (2017.01)
*G06T 7/90* (2017.01)
*H04N 5/265* (2006.01)
*H04N 23/63* (2023.01)
*H04N 23/80* (2023.01)
*G06F 3/041* (2006.01)

(52) U.S. Cl.
CPC ............... *G06T 7/90* (2017.01); *H04N 5/265* (2013.01); *H04N 23/632* (2023.01); *H04N 23/80* (2023.01); *G06F 3/041* (2013.01); *G06T 2200/24* (2013.01); *G06T 2207/20221* (2013.01)

(58) Field of Classification Search
CPC ........... G06T 2207/20221; G06T 11/60; G06T 3/0012; H04N 5/23229; H04N 5/232935; H04N 5/265; H04N 5/2621; H04N 5/23216; G06F 3/041; G06F 3/04845; G06F 3/04883; G11B 27/031; G11B 27/34
USPC ......................................................... 348/239
See application file for complete search history.

(56) References Cited

U.S. PATENT DOCUMENTS

| | | |
|---|---|---|
| 2009/0021695 A1 | 1/2009 | Scarpino |
| 2010/0182481 A1* | 7/2010 | Kobayashi ............ G06F 3/0412 348/E5.022 |
| 2011/0249863 A1* | 10/2011 | Ohashi ................. G06V 40/175 382/103 |
| 2013/0328906 A1 | 12/2013 | Webb et al. |
| 2016/0300358 A1 | 10/2016 | Minato et al. |
| 2018/0032235 A1 | 2/2018 | Choi et al. |
| 2018/0033173 A1* | 2/2018 | Choi ..................... H04L 67/131 |
| 2018/0075523 A1 | 3/2018 | Sartori Odizzio et al. |
| 2018/0301171 A1* | 10/2018 | Yamana ................. G11B 27/34 |

FOREIGN PATENT DOCUMENTS

| | | |
|---|---|---|
| JP | H01-175076 A | 7/1989 |
| JP | 2006-338604 A | 12/2006 |
| JP | 2007-094623 A | 4/2007 |

OTHER PUBLICATIONS

An Office Action mailed by the China National Intellectual Property Administration on Aug. 23, 2024, which corresponds to Chinese Patent Application No. 202010944029.0 and is related to U.S. Appl. No. 18/344,387; with English translation.

* cited by examiner

IMAGE PROCESSING APPARATUS, IMAGING APPARATUS, IMAGE PROCESSING METHOD, AND IMAGE PROCESSING PROGRAM

CROSS-REFERENCE TO RELATED APPLICATIONS

The present application is a Continuation of U.S. patent application Ser. No. 17/008,477 filed on Aug. 31, 2020, which claims priority under 35 U.S.C. § 119 to Japanese Patent Application No. 2019-167365 filed on Sep. 13, 2019. The above application is hereby expressly incorporated by reference, in its entirety, into the present application.

BACKGROUND

1. Technical Field

The present disclosure relates to an image processing apparatus, an imaging apparatus, an image processing method, and an image processing program.

2. Description of the Related Art

Generally, for example, a composite image in which a compositing target image is composited in a selection image selected by a user is created and displayed on a display unit. For example, JP1989-175076A (JP-H1-175076A) discloses a technology for allowing a user to designate a region desired to be cut out from an original image by a container line, cutting out a region including a predetermined ratio or higher of an area of a region that is continuous in the same color from the region indicated by the container line, and performing insertion compositing in any image.

SUMMARY

In the technology disclosed in JP1989-175076A (JP-H1-175076A), designation of the region to be cut out or color is performed by allowing the user to designate pixels using a coordinate input apparatus consisting of a tablet and a tablet pen. In the technology disclosed in JP1989-175076A (JP-H1-175076A), an effort is required to cut out the image. Thus, a problem arises with respect to the operability of the user.

The present disclosure is conceived in view of the above matter, and an object thereof is to provide an image processing apparatus, an imaging apparatus, an image processing method, and an image processing program facilitating creation of a composite image and improving operability of a user related to compositing.

In order to achieve the object, an image processing apparatus of a first aspect of the present disclosure comprises a display control unit that displays a specifying frame for specifying a partial region in a display image displayed on a display unit and a color designation mark for designating a reference color from colors included in an image in the specifying frame, in superposition with the display image, an extraction unit that extracts an image corresponding to the reference color designated by the color designation mark from the image in the specifying frame, as a compositing target image, and a compositing unit that generates a composite image in which the compositing target image is composited in a selection image selected by a user.

According to the image processing apparatus of a second aspect of the present disclosure, in the image processing apparatus of the first aspect, the color designation mark is displayed in the specifying frame, and a relative positional relationship between the specifying frame and the color designation mark is predetermined.

According to the image processing apparatus of a third aspect of the present disclosure, in the image processing apparatus of the first aspect or the second aspect, a first reception unit that receives a size change instruction for enlarging or reducing the specifying frame, is further comprised, in which the display control unit performs control for changing a size of the specifying frame in accordance with the size change instruction received by the first reception unit.

According to the image processing apparatus of a fourth aspect of the present disclosure, in the image processing apparatus of any one of the first aspect to the third aspect, a second reception unit that receives a movement instruction for moving a position of the specifying frame, is further comprised, in which the display control unit performs control for moving the position of the specifying frame in accordance with the movement instruction received by the second reception unit.

According to the image processing apparatus of a fifth aspect of the present disclosure, in the image processing apparatus of any one of the first aspect to the fourth aspect, a color of the display image in a part on which the color designation mark is superposed is set as the reference color.

According to the image processing apparatus of a sixth aspect of the present disclosure, in the image processing apparatus of the fifth aspect, the display control unit further displays an indicator that has a larger area than the color designation mark and that represents the reference color.

According to the image processing apparatus of a seventh aspect of the present disclosure, in the image processing apparatus of any one of the first aspect to the fourth aspect, the color designation mark has a shape surrounding a part of the display image, and the extraction unit sets a color of the display image surrounded by the color designation mark, as the reference color.

According to the image processing apparatus of an eighth aspect of the present disclosure, in the image processing apparatus of the seventh aspect, the display control unit further displays an indicator that has a larger area than a region of the display image surrounded by the color designation mark and that represents the reference color.

According to the image processing apparatus of a ninth aspect of the present disclosure, in the image processing apparatus of any one of the first aspect to the eighth aspect, the extraction unit quantifies gradation of an entire image in the specifying frame and extracts an image in which a numerical value of gradation is within a reference color range including a numerical value of gradation to which the reference color corresponds, as the compositing target image.

According to the image processing apparatus of a tenth aspect of the present disclosure, in the image processing apparatus of the ninth aspect, a setting unit for allowing the user to set the reference color range, is further comprised.

An imaging apparatus of an eleventh aspect of the present disclosure comprises an imaging unit that images a subject, a display unit that displays an image captured by the imaging unit, and the image processing apparatus of any one of the first aspect to the tenth aspect.

According to the imaging apparatus of a twelfth aspect of the present disclosure, in the imaging apparatus of the eleventh aspect, live view display of a display image is performed on the display unit.

In order to achieve the object, an image processing method of a thirteenth aspect of the present disclosure executed by a computer, comprises displaying a specifying frame for specifying a partial region in a display image displayed on a display unit and a color designation mark for designating a reference color from colors included in an image in the specifying frame, in superposition with the display image, extracting an image corresponding to the reference color designated by the color designation mark from the image in the specifying frame, as a compositing target image, and generating a composite image in which the compositing target image is composited in a selection image selected by a user.

In order to achieve the object, an image processing program of a fourteenth aspect of the present disclosure causes a computer to execute a process, the process comprising displaying a specifying frame for specifying a partial region in a display image displayed on a display unit and a color designation mark for designating a reference color from colors included in an image in the specifying frame, in superposition with the display image, extracting an image corresponding to the reference color designated by the color designation mark from the image in the specifying frame, as a compositing target image, and generating a composite image in which the compositing target image is composited in a selection image selected by a user.

An image processing apparatus of the present disclosure comprises a memory that stores a command to be executed by a computer, and a processor configured to execute the stored command. The processor displays a specifying frame for specifying a partial region in a display image displayed on a display unit and a color designation mark for designating a reference color from colors included in an image in the specifying frame, in superposition with the display image, extracts an image corresponding to the reference color designated by the color designation mark from the image in the specifying frame, as a compositing target image, and generates a composite image in which the compositing target image is composited in a selection image selected by a user.

According to the present disclosure, creation of the composite image can be facilitated, and the operability of the user related to compositing can be improved.

BRIEF DESCRIPTION OF THE DRAWINGS

Exemplary embodiments according to the technique of the present disclosure will be described in detail based on the following figures, wherein.

DETAILED DESCRIPTION

Figure 1:
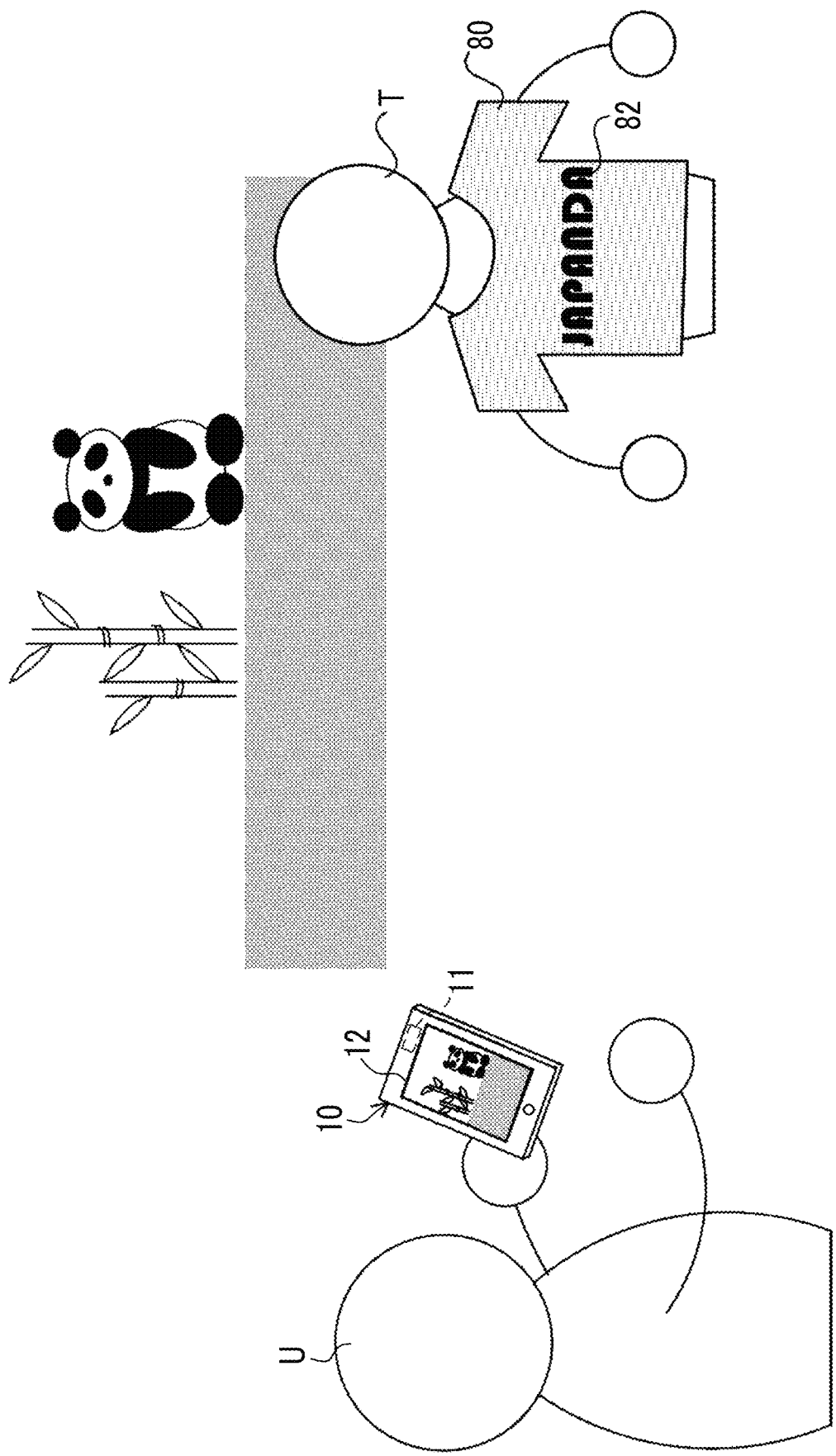
FIG. 1 is a diagram illustrating one example of a state where a user performs imaging using a portable terminal that is one example of an imaging apparatus.

Hereinafter, an embodiment of the present disclosure will be described in detail with reference to the drawings. As illustrated in FIG. 1, for example, a portable terminal 10 is a smartphone. The portable terminal 10 functions as a mobile phone and also functions as a computer executing various application programs called apps or the like. The portable terminal 10 can also image photographs and is one example of an imaging apparatus.

An imaging unit 11 (refer to FIG. 2) that images a subject is incorporated in a main body of the portable terminal 10. A touch panel display 12 is disposed on a front surface of the main body of the portable terminal 10. The portable terminal 10 can perform live view display of sequentially displaying a captured image captured by the imaging unit 11 on the touch panel display 12 as a live view image.

In the live view display, for example, the imaging unit 11 outputs the captured image at a frame rate of 30 frames per second and updates the live view image displayed on the touch panel display 12 at the frame rate. Thus, the live view image of the live view display is visually recognized as a motion picture. Since the live view display of the subject is performed, a user U can perform imaging while checking composition of the subject and the captured image through display of the touch panel display 12.

Figure 2:
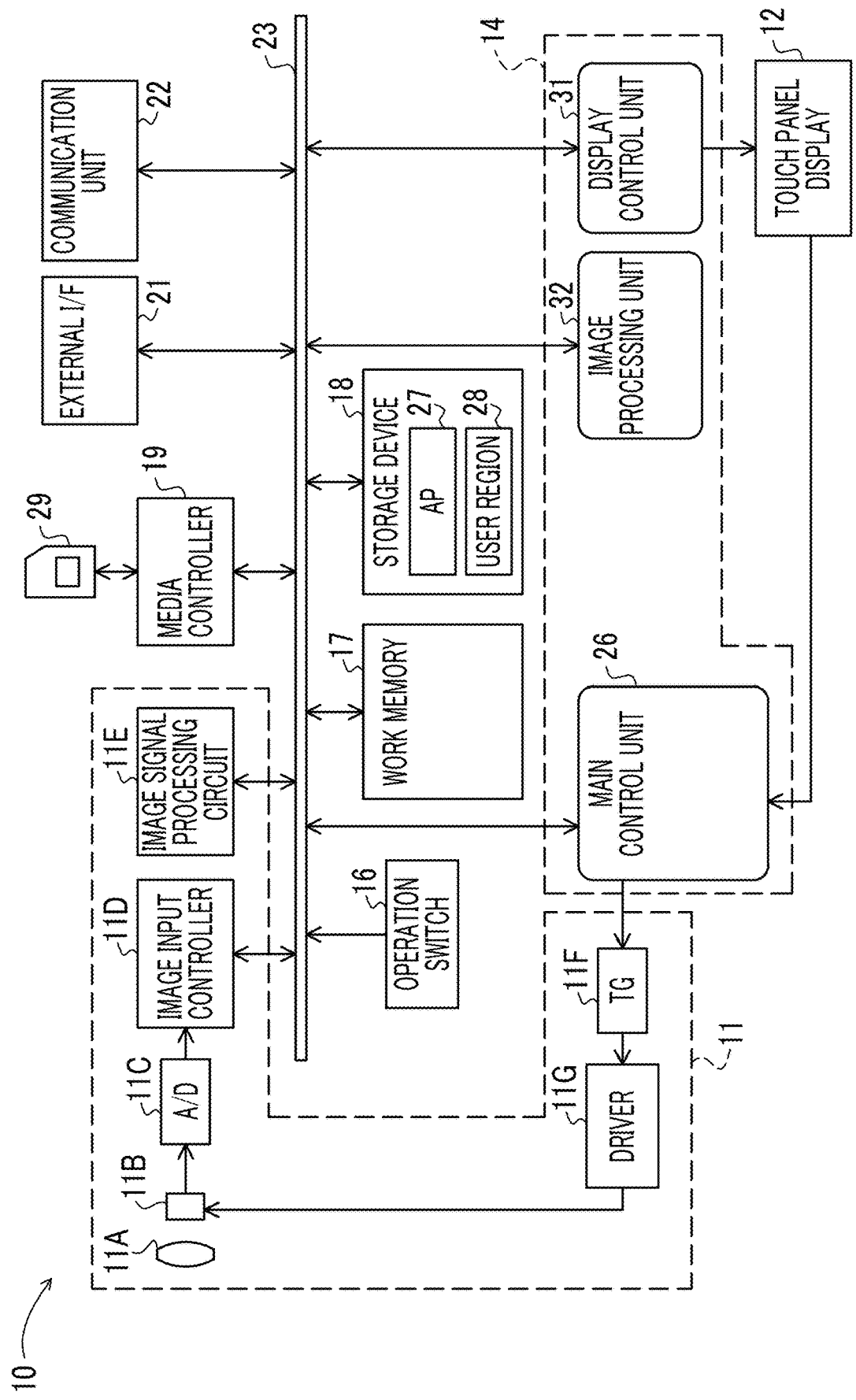
FIG. 2 is a diagram illustrating a summary of one example of an electric configuration of the portable terminal.

As illustrated in FIG. 2 as one example, the portable terminal 10 comprises the imaging unit 11, the touch panel display 12, a central processing unit (CPU) 14, an operation switch 16, a work memory 17, a storage device 18, a media controller 19, an external interface (I/F) 21, and a communication unit 22. These units are communicably connected through a busline 23.

The CPU 14 functions as a main control unit 26 and a display control unit 31 by executing an operating system (not illustrated). The main control unit 26 generally controls each unit of the portable terminal 10. The display control unit 31 controls display of the touch panel display 12. The CPU 14 also functions as an image processing unit 32 that performs image processing on the image captured by the imaging unit 11.

The work memory 17 is a volatile memory that is used as a work area in a case where the CPU 14 executes various programs. A random access memory (RAM) is used as the work memory 17. The work memory 17 is also used as a memory for work in the case of performing the live view display and the image processing as described later.

The storage device 18 stores the operating system and also various programs such as an application program (AP) 27. Examples of the application program 27 include a photograph compositing application program, described later, and also image display software, a web browser, and a mail application program.

A user region 28 in which the user U stores data of the user such as image data representing the image captured using the portable terminal 10 is set in the storage device 18. The storage device 18 is a non-volatile memory such as a flash memory. A hard disk drive (HDD), a solid state drive (SSD), or the like may also be used as the storage device 18.

The touch panel display 12 is one example of a display unit displaying an operation screen that is stored in the storage device 18 and functions as a graphical user interface (GUI), the image captured by the imaging unit 11, and the like. The touch panel display 12 has a function of detecting a touch operation performed using a finger or the like of the user U and inputs an operation instruction into the main control unit 26 by detecting the touch operation. As is well known, the touch panel display 12 is configured with a display unit such as a liquid crystal display (LCD) or an organic electro-luminescence (EL) display and a touch panel unit of a resistive film type, an electrostatic capacitive type, or the like.

The operation switch 16 includes various mechanical operation units such as a multifunction key and a power button disposed in the main body of the portable terminal 10 and inputs the operation instruction into the main control unit 26.

The main control unit 26 is a reception unit that receives the input of the operation instruction from the touch panel display 12 and the operation switch 16.

The display control unit 31 performs control for displaying the operation screen, the image, and the like on the touch panel display 12 under control of the main control unit 26. The display control unit 31 performs processing or the like of converting data of the operation screen, the image, and the like into a video signal handled by the touch panel display 12 and outputs the video signal to the touch panel display 12.

The image processing unit 32 performs various types of image processing such as general image processing including brightness correction and compression and decompression processing, and also image extraction and image compositing, described later, on the captured image captured by the imaging unit 11.

The media controller 19 writes and reads out data with respect to attachable and detachable removable media such as a memory card 29.

The external I/F 21 is an interface such as a universal serial bus (USB) connector. A charging cable, a communication cable, a USB memory, or the like is connected to the external I/F 21.

The communication unit 22 has an antenna and a communication control circuit (none illustrated) and has a communication function of wireless communication, short range wireless communication, and the like through a mobile communication network and a wireless local area network (LAN).

The imaging unit 11 has, for example, an imaging lens 11A, an image sensor 11B, an analog-to-digital (AD) converter (A/D) 11C, an image input controller 11D, an image signal processing circuit 11E, a timing generator (TG) 11F, and a driver 11G.

The imaging lens 11A forms a subject image on an imaging surface of the image sensor 11B by condensing light from the subject. The image sensor 11B photoelectrically converts subject light imaged by an imaging element and outputs the subject light as an analog image signal. For example, a charge coupled device (CCD) image sensor or a complementary metal oxide semiconductor (CMOS) image sensor is used as the image sensor 11B. In the case of performing the live view display, the image sensor 11B sequentially outputs the analog image signal at a preset frame rate.

The AD converter 11C converts the analog image signal from the image sensor 11B into a digital image signal. The image input controller 11D records the digital image signal input from the AD converter 11C in the work memory 17 as the captured image. While live view imaging is performed, the image input controller 11D records the captured image in the work memory 17 as a live view image. In the work memory 17, the live view image is used in the live view display and is sequentially updated in accordance with the frame rate of the image sensor 11B.

The image signal processing circuit 11E performs various types of signal processing such as white balance processing, gamma-correction processing, and YC conversion processing on the captured image recorded in the work memory 17 by the image input controller 11D. The white balance processing is processing of adjusting white balance by adjusting a gain of each image signal of red (R), green (G), and blue (B) included in the captured image. The gamma-correction processing is gradation transformation processing performed on the image signal in accordance with prestored gamma characteristics. The YC processing is processing of converting the image signals of R, G, and B into a brightness signal Y and color difference signals Cr and Cb. The captured image processed by the image signal processing circuit 11E is written back to the work memory 17.

The timing generator 11F generates a timing signal prescribing an operation timing of the image sensor 11B under control of the main control unit 26. The driver 11G drives the image sensor 11B based on the timing signal from the timing generator 11F.

In a case where the portable terminal 10 functions as the imaging apparatus by operating the imaging unit 11, the display control unit 31 performs control for performing the live view display of the captured image captured by the imaging unit 11 on the touch panel display 12 as a live view image. For example, the live view display is started at the same time as the start of the imaging unit 11. The live view display is temporarily stopped while an image storage operation in response to the operation of a shutter button is executed, but is basically continued until the operation of the imaging unit 11 is finished.

More specifically, the imaging unit 11 sequentially outputs the captured image at the frame rate, and the captured image is output to the work memory 17. The captured image is subjected to signal processing by the image signal processing circuit 11E and then, is recorded in the work memory 17. In the live view display, the captured image is recorded in the work memory 17 as a live view image and is sequentially updated at the frame rate. The display control unit 31 implements the live view display by reading out the live view image sequentially updated in the work memory 17 and sequentially updating the display of the touch panel display 12. Imaging performed for the live view display by the imaging unit 11 will be referred to as the live view imaging.

During the live view display, an image storage instruction is input in a case where the shutter button is operated by the user U. In a case where the image storage instruction is input, the captured image captured at the timing is stored at a preset storage destination in the user region 28 of the storage device 18 or the memory card 29. In the case of recording the captured image in the memory card 29, the image processing unit 32 performs recording through the media controller 19.

The captured image for storage may be an image recorded in the work memory 17 to be used as a live view image or an image newly acquired by the imaging unit 11 at the timing of operation of the shutter button.

The photograph compositing application program that performs the live view display by performing image compositing on the live view image is installed on the portable terminal 10 as one application program 27. For example, the photograph compositing application program extracts a part of a display image as a compositing target image while the live view display of the display image as a live view image is performed. A function of generating a composite image in which an extracted compositing target image 54 is composited with a selection image different from the display image, and performing the live view display of the generated composite image as a live view image is implemented in the portable terminal 10.

The photograph compositing application program of the present embodiment is one example of an image processing program according to the present disclosure, and the portable terminal 10 of the present embodiment functions as one example of an image processing apparatus according to the present disclosure by operating the photograph compositing application program. A configuration related to the function of the portable terminal 10 corresponding to the operation of the photograph compositing application program will be described with reference to FIG. 3 to FIG. 5.

First, a function related to preprocessing of photograph compositing in the portable terminal 10 will be described with reference to FIG. 3 and FIG. 4. In a case where the photograph compositing application program is started, the CPU 14 functions as the display control unit 31 and the image processing unit 32.

Figure 3:
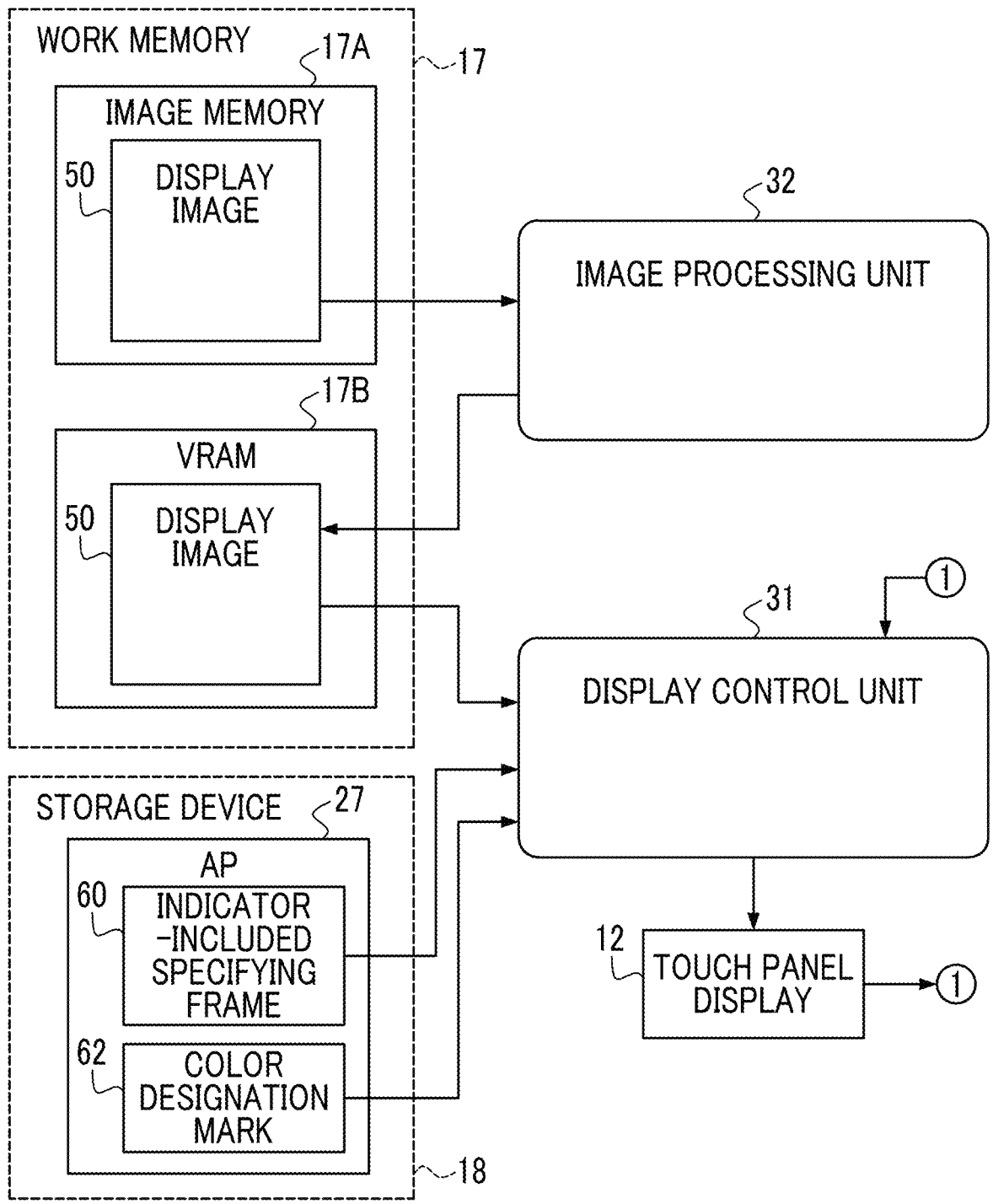
FIG. 3 is a function block diagram illustrating one example of a configuration of the portable terminal.

As illustrated in FIG. 3, regions functioning as an image memory 17A and a video random access memory (VRAM) 17B are set in the work memory 17. The image memory 17A is a region in which the captured image output from the imaging unit 11 is temporarily recorded as a live view image. The VRAM 17B is a region in which the live view image subjected to image processing in the image processing unit 32 is recorded.

In a case where the photograph compositing application program is started, the imaging unit 11 starts the live view imaging of a display image 50. The display image 50 is recorded in the image memory 17A as a live view image. The display image 50 in the image memory 17A is sequentially updated to the most recent captured image that is output in accordance with the frame rate of the imaging unit 11. The display image 50 is the live view image captured by the imaging unit 11 and is an image of an extraction source of the compositing target image 54 (refer to FIG. 5).

The display image 50 is read out from the image memory 17A by the image processing unit 32. The display image 50 is subjected to image processing such as the brightness correction by the image processing unit 32 and then, is recorded in the VRAM 17B. The display control unit 31 reads out the display image 50 of the live view image from the VRAM 17B and performs the live view display of the display image 50 on the touch panel display 12.

In the storage device 18, data of an indicator-included specifying frame 60 and a color designation mark 62 is recorded as data to be used by the photograph compositing application program as the application program 27.

Figure 4:
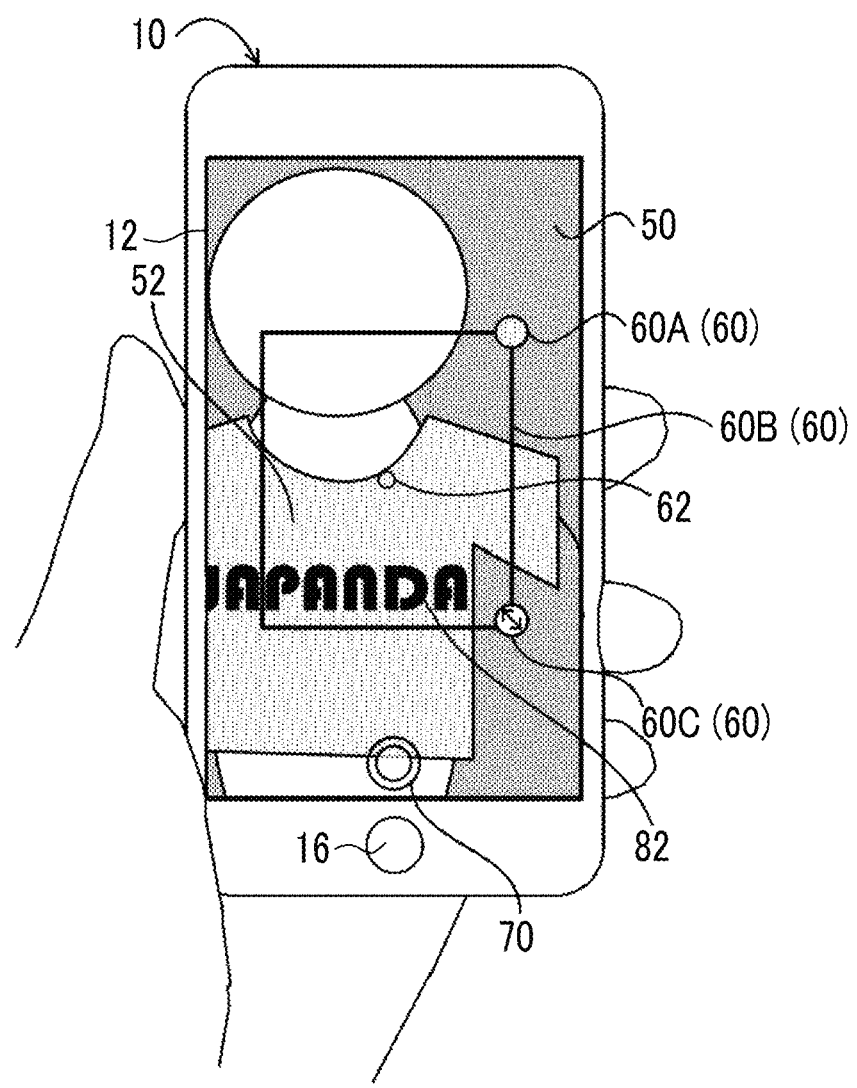
FIG. 4 is a diagram illustrating a display example of an indicator-included specifying frame.

In the case of performing the live view display of the display image 50, as illustrated in FIG. 4, the display control unit 31 displays the indicator-included specifying frame 60 and the color designation mark 62 on the touch panel display 12 in superposition with the display image 50 as a GUI for extracting the compositing target image 54 in the display image 50.

FIG. 4 illustrates one example of a state where the display control unit 31 displays the indicator-included specifying frame 60 and the color designation mark 62 in superposition with the display image 50 displayed on the touch panel display 12 of the portable terminal 10. The indicator-included specifying frame 60 is a GUI used by the user U in order for the user to specify a range within which the compositing target image 54 is to be extracted from the display image 50. A region specified by the indicator-included specifying frame 60 is a specified region 52, and a part of the specified region 52 is extracted as the compositing target image 54. As illustrated in FIG. 4, the indicator-included specifying frame 60 of the present embodiment includes an indicator 60A, a specifying frame 60B, and an enlarging and reducing instruction mark 60C. The specifying frame 60B of the indicator-included specifying frame 60 of the present embodiment is one example of a specifying frame for specifying a partial region in a display image according to the present disclosure. The indicator 60A of the indicator-included specifying frame 60 of the present embodiment is one example of an indicator representing a reference color according to the present disclosure. The specified region 52 of the present embodiment is one example of the partial region in the display image according to the present disclosure and is one example of an image in the specifying frame according to the present disclosure.

As illustrated in FIG. 4, a region surrounded by the specifying frame 60B is the specified region 52. In the present embodiment, the size of the specifying frame 60B can be increased and decreased. In other words, the user U can change the size (range) of the specified region 52. As one example, in the present embodiment, the specifying frame 60B is enlarged or reduced by allowing the user U to operate the enlarging and reducing instruction mark 60C. In a case where the main control unit 26 receives an operation instruction for enlarging or reducing the specifying frame 60B, the main control unit 26 outputs information about the received operation instruction to the display control unit 31. The operation instruction for enlarging or reducing the specifying frame 60B of the present embodiment is one example of a size change instruction for changing the size of the specifying frame 60B according to the present disclosure. The display control unit 31 changes the specifying frame 60B to a size corresponding to the information about the operation instruction input from the main control unit 26. In this case, the main control unit 26 of the present embodiment is one example of a first reception unit according to the present disclosure. While the specifying frame 60B can be enlarged and reduced in the present embodiment as one example, a form of enabling at least one of enlarging or reducing may be available.

In the present embodiment, the specifying frame 60B can be moved. In other words, the user U can change the position of the specifying frame 60B with respect to the display image 50. In a case where the main control unit 26 receives an operation instruction for moving the specifying frame 60B, the main control unit 26 outputs information about the received operation instruction to the display control unit 31. The operation instruction for moving the specifying frame 60B of the present embodiment is one example of a movement instruction for moving the position of the specifying frame 60B according to the present disclosure. The display control unit 31 moves the indicator-included specifying frame 60 to a position corresponding to the information about the operation instruction input from the main control unit 26. In this case, the main control unit 26 of the present embodiment is one example of a second reception unit according to the present disclosure.

As illustrated in FIG. 4, the color designation mark 62 is displayed in the specifying frame 60B. In the present embodiment, a relative positional relationship between the specifying frame 60B and the color designation mark 62 is predetermined. As one example, in the present embodiment, the position of the color designation mark 62 is set as the position of the center (centroid) of the specifying frame 60B. The color designation mark 62 is an image representing a mark for designating the reference color from the color of an image in the specified region 52. The color designation mark 62 of the present embodiment is one example of a color designation mark according to the present disclosure. As one example, the color designation mark 62 of the present embodiment is a mark having a shape of a circular ring surrounding the display image 50, and the color of the display image 50 inside the circular ring is designated as the reference color.

The indicator 60A has a larger area than the color designation mark 62 and displays the reference color designated by the color designation mark 62.

Figure 5:
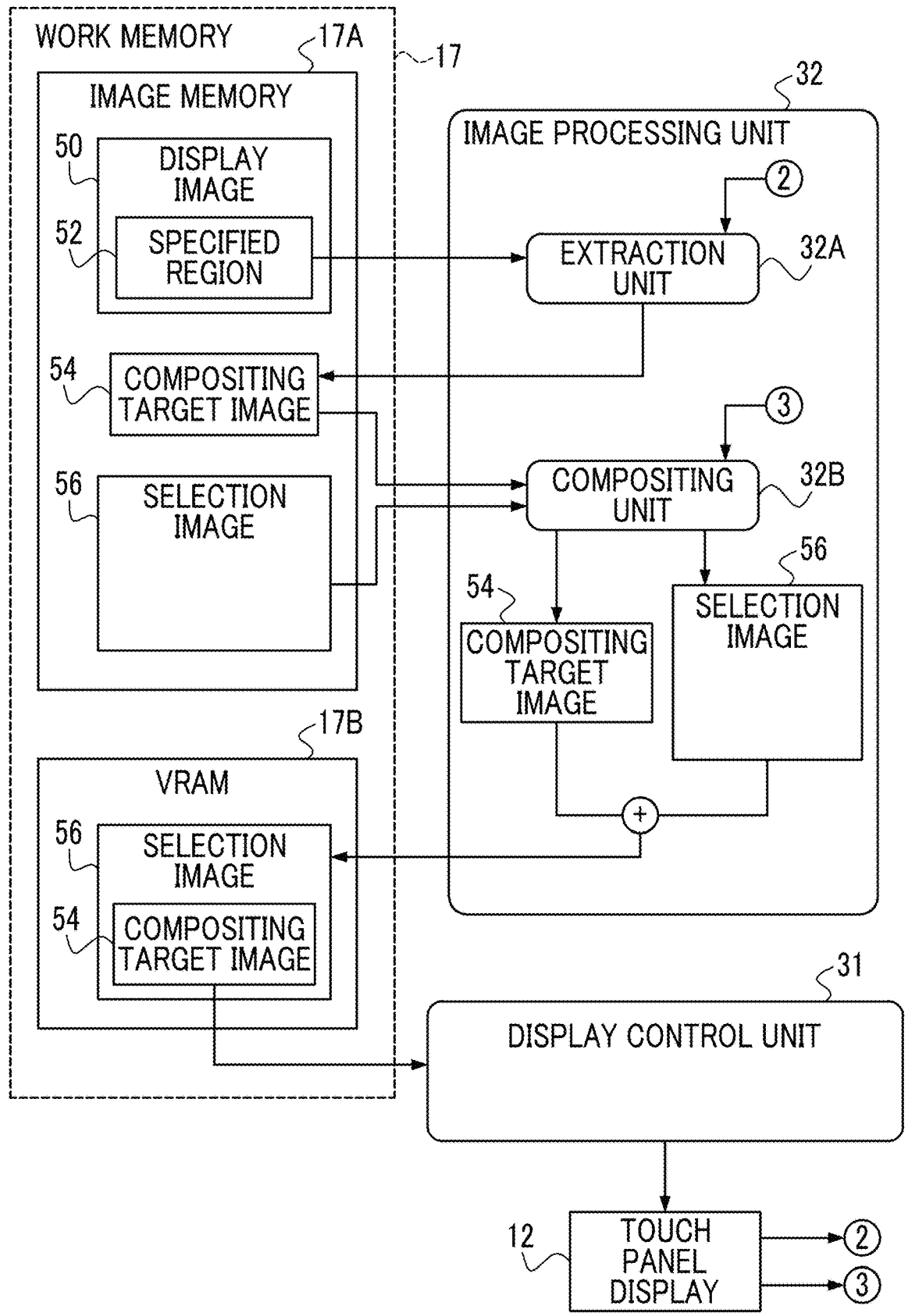
FIG. 5 is a function block diagram illustrating one example of the configuration of the portable terminal.

Next, a function related to composited imaging processing in the portable terminal 10 will be described with reference to FIG. 5. In a case where the photograph compositing application program is started, the CPU 14 functions as an extraction unit 32A and a compositing unit 32B of the image processing unit 32.

The extraction unit 32A extracts a part of the display image 50 as the compositing target image 54 to be composited with an image. Specifically, the extraction unit 32A extracts the compositing target image 54 from the specified region 52 specified from the display image 50. More specifically, the extraction unit 32A extracts an image corresponding to the reference color designated by the color designation mark 62 from the specified region 52 specified by the specifying frame 60B of the indicator-included specifying frame 60 as the compositing target image 54. Examples of the image used as the compositing target image 54 include an image representing a mark or a character string. The mark includes at least one of a text, a figure, a pattern, or a combination of two or more selected from the text, the figure, and the pattern. The text is a concept including a number and a symbol. The mark includes a logo indicating a company name, a product name, a store name, a station name, a place name, or the like. The pattern includes a streak pattern, a checkered pattern, a dotted pattern, and the like. The mark also includes a mark configured with one character of any of a text, a number, or a symbol.

The character string includes a message configured with a handwritten text or a printed text, a traffic safety slogan, a greeting text for welcome and farewell at a tourist place, an advertising text for a product, and the like. For example, the message is a phrase for delivering feelings toward a specific person like "thank you for the other day" or "congratulations on admission to school" and includes a congratulatory phrase, a phrase of gratitude, a greeting text, and the like.

Besides, a seal or an imprint of a stamp or the like provided to a tourist at a tourist attraction is also included in the mark. A red seal or the like that is a seal or an imprint provided to a worshiper at a temple or a shrine is also included in any of the mark or the character string. The text included in the mark or the character string is not limited to Japanese and may be in foreign languages such as English, Chinese, and Korean.

The extraction unit 32A extracts the region of the image corresponding to the reference color as the compositing target image 54 based on the contrast of the image in the specified region 52. In a case where the compositing target image 54 is extracted from the display image 50, the extracted compositing target image 54 is recorded in the image memory 17A.

The imaging unit 11 starts the live view imaging of a selection image 56 in a state where the compositing target image 54 is stored in the image memory 17A. The selection image 56 is recorded in the image memory 17A as a live view image. The live view display of the selection image 56 is started on the touch panel display 12. The selection image 56 is the live view image captured by the imaging unit 11 and is an image of a compositing destination in which the compositing target image 54 is composited.

The compositing unit 32B generates a composite image in which the selection image 56 and the compositing target image 54 are composited. The selection image 56 in which the compositing target image 54 is composited is recorded in the VRAM 17B as the composite image. The display control unit 31 starts the live view display of the selection image 56 in which the compositing target image 54 is composited as the composite image.

The main control unit 26 receives an instruction for at least one of a display position, a display attitude, a display size, or a display color of the compositing target image 54 in the touch panel display 12 based on an operation instruction input through the touch panel display 12. The operation instruction received by the main control unit 26 is input into the compositing unit 32B. The compositing unit 32B changes the display position and the like of the compositing target image 54 in the selection image 56 based on the input operation instruction.

In the same manner as the case of normal imaging, during the live view display of the selection image 56 in which the compositing target image 54 is composited, the image storage instruction is input in a case where the shutter button is operated by the user U. In a case where the image storage instruction is input, the selection image 56 in which the compositing target image 54 is composited is stored at the timing at a preset storage destination in the user region 28 of the storage device 18 or the memory card 29 as a composite image for storage. As one example, in the present embodiment, a composite image that is compressed by performing compression processing on the composite image by the image processing unit 32 is recorded at the preset storage destination.

An effect of the above configuration will be described with reference to FIG. 1, FIG. 4, and FIG. 6 to FIG. 15.

As described above, FIG. 1 illustrates a scene in which the user U performs imaging using the portable terminal 10. The scene illustrated in FIG. 1 is a zoo where the user U visits together with a friend T and a "panda" is present. A text 82 of "JAPANDA" is printed on a shirt 80 worn by the friend T. In the present example, an example in which the user U thinks of imaging a composite photograph in which two subjects including the "panda" and the text 82 of "PANDA" in "JAPANDA" are combined based on similarity in nuance between the "panda" and "JAPANDA" and performs the imaging at the location using the portable terminal 10 will be described.

Figure 6:
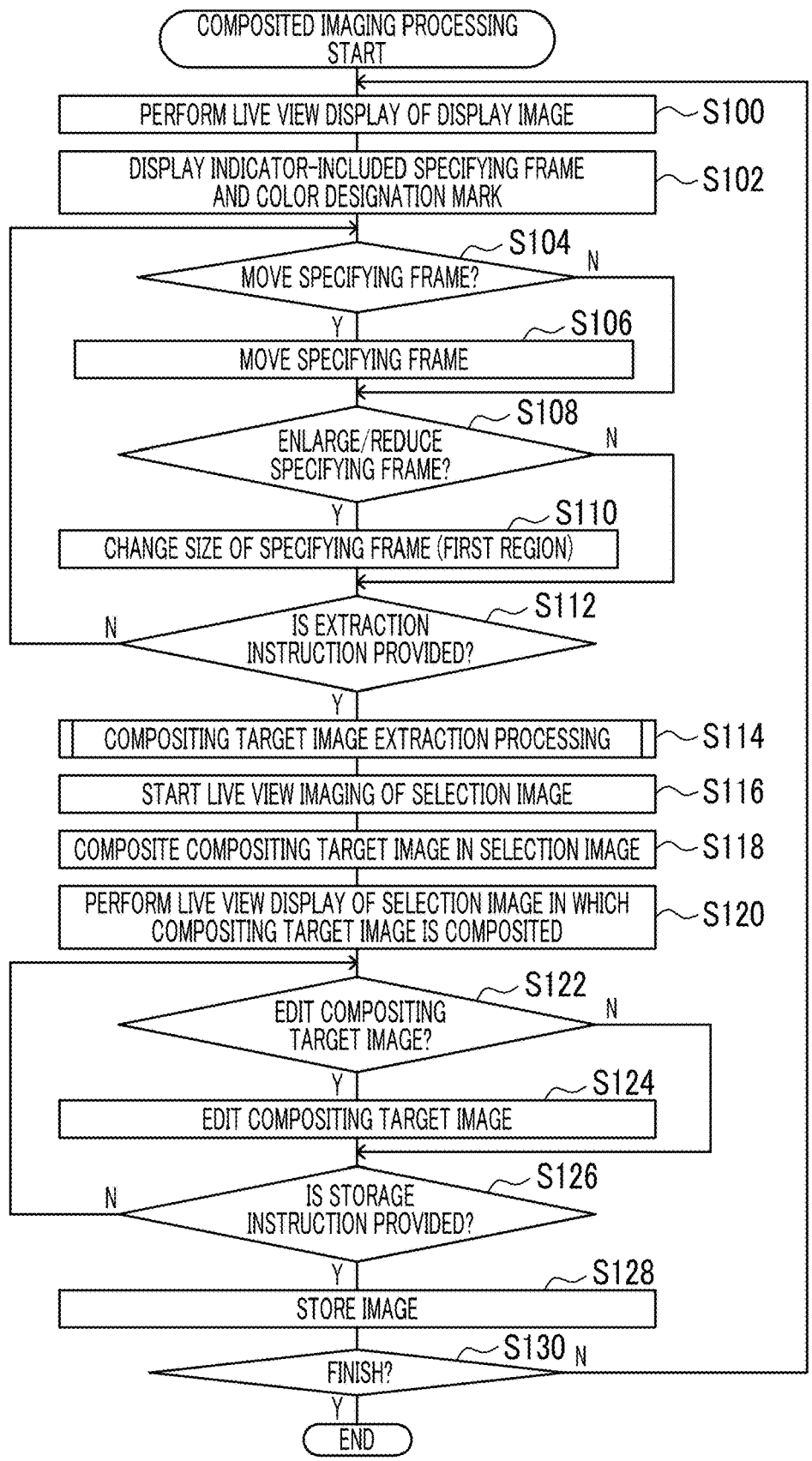
FIG. 6 is a flowchart illustrating one example of composited imaging processing.

As illustrated in FIG. 6, in the portable terminal 10, in a case where the photograph compositing application program is started, the portable terminal 10 transitions to a composited imaging mode and executes the composited imaging processing. In a case where the composited imaging processing is started, first, in step S100, the display control unit 31 performs the live view display of the display image 50 on the touch panel display 12. Specifically, the live view display of the display image 50 is started in the touch panel display 12 by starting the live view imaging of the display image 50 in the imaging unit 11.

Next, in step S102, as illustrated in FIG. 4, the display control unit 31 displays the indicator-included specifying frame 60 and the color designation mark 62 on the touch panel display 12 in superposition with the display image 50 of the live view display.

In a case where the indicator-included specifying frame 60 and the color designation mark 62 are displayed, the user U performs an adjustment to a state where the text 82 desired to be extracted falls in the specifying frame 60B. In the portable terminal 10 of the present embodiment, the color of the text 82 desired to be extracted is set as the reference color. Thus, the user U adjusts the position of the color designation mark 62 to a position overlaid on the image of the color of the text 82 desired to be extracted. For example, the user U performs an adjustment to a state where the color designation mark 62 is overlaid on the text 82 desired to be extracted. Examples of a method of performing the adjustments include a method of adjusting an imaging range, that is, the subject captured in the display image 50, by allowing the user U to move the portable terminal 10. Examples of the method of performing the adjustments also include an adjustment method by moving the specifying frame 60B (specified region 52) and an adjustment method by enlarging or reducing the specifying frame 60B (specified region 52).

Therefore, next, in step S104, as described above, the main control unit 26 determines whether or not the operation instruction for moving the specifying frame 60B is received. As one example, in the present embodiment, the operation instruction of the user U for moving the specifying frame 60B is provided by allowing the user U to perform a gesture of sliding a finger toward a desired direction of movement in a state where the user U touches the specifying frame 60B displayed on the touch panel display 12 using one finger. Such a gesture is referred to as a swipe or the like.

In a case where the main control unit 26 does not receive the operation instruction for moving the specifying frame 60B, the determination in step S104 results in a negative determination, and a transition is made to step S108. In a case where the main control unit 26 receives the operation instruction for moving the specifying frame 60B, the determination in step S104 results in a positive determination, and a transition is made to step S106.

In step S106, the display control unit 31 moves the specifying frame 60B to a position corresponding to the operation instruction for moving the specifying frame 60B. Specifically, coordinate information representing the specifying frame 60B after movement is output to the display control unit 31 from the main control unit 26 as information about the operation instruction. The display control unit 31 displays the specifying frame 60B at a position corresponding to the coordinate information input from the main control unit 26.

Figure 7:
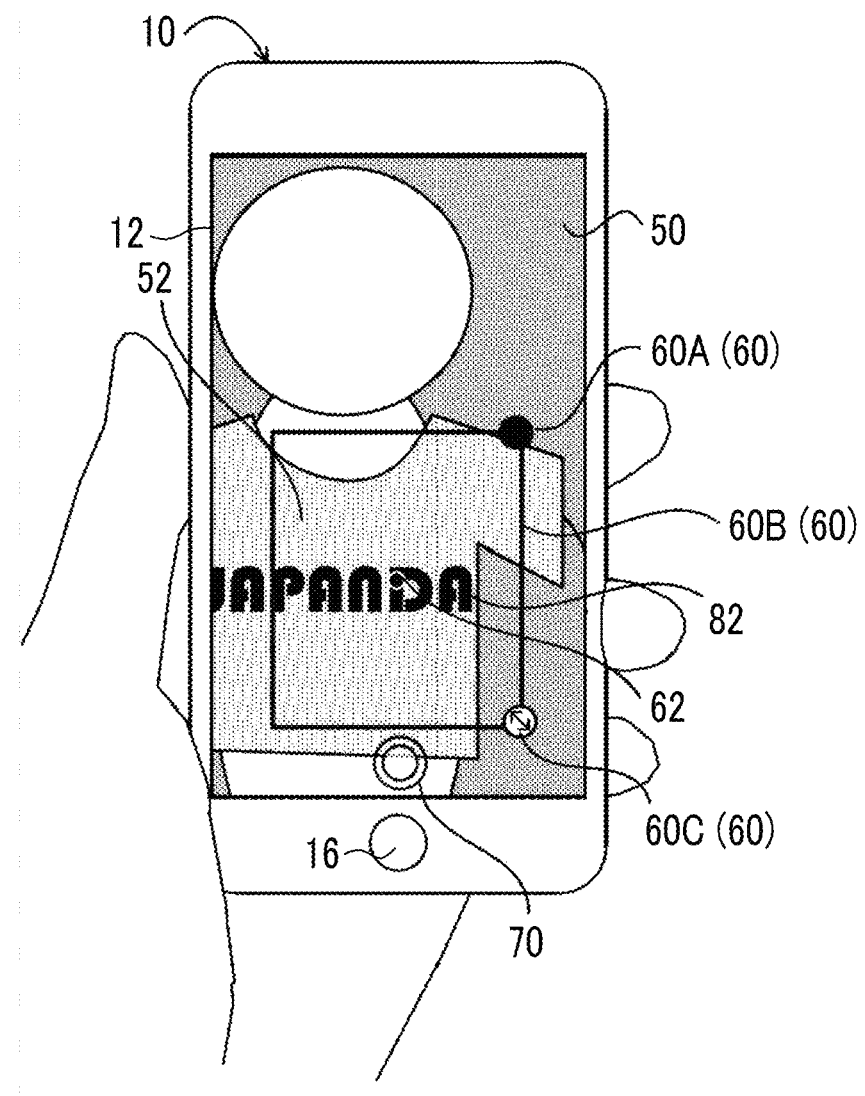
FIG. 7 is a diagram for describing movement of the specifying frame.

FIG. 7 illustrates one example of display of the moved specifying frame 60B. In the example illustrated in FIG. 7, one example of a state where the position of the specifying frame 60B, more specifically, the position of the specifying frame 60B with respect to the display image 50, is moved downward (closer to the operation switch 16) compared to the example illustrated in FIG. 4 is illustrated.

Next, in step S108, as described above, the main control unit 26 determines whether or not the operation instruction for enlarging or reducing the specifying frame 60B is received. As one example, in the present embodiment, the operation instruction of the user U is provided by allowing the user U to perform a gesture of sliding the finger toward a direction corresponding to a size to which enlarging or reducing is desired in a state where the user U touches the enlarging and reducing instruction mark 60C displayed on the touch panel display 12 using one finger. A method of providing the operation instruction for enlarging or reducing the specifying frame 60B is not limited to the present embodiment and may be, for example, a method of providing the operation instruction by allowing the user U to perform a gesture of pinching in or pinching out the specifying frame 60B or the specified region 52 displayed on the touch panel display 12. Pinching out is a gesture of increasing an interval between two fingers in a state where a display screen is touched using two fingers on the touch panel display 12. In a case where pinching out is performed in a state where the top and the bottom or the left and the right of the specifying frame 60B or the specified region 52 are touched using two fingers, the specifying frame 60B is enlarged, and the area of the specified region 52 is increased. Contrary to pinching out, pinching in is a gesture of decreasing the interval between two fingers. In a case where pinching in is performed, the specifying frame 60B is reduced, and the area of the specified region 52 is decreased.

In a case where the main control unit 26 does not receive the operation instruction for enlarging or reducing the specifying frame 60B, the determination in step S108 results in a negative determination, and a transition is made to step S112. In a case where the main control unit 26 receives the operation instruction for enlarging or reducing the specifying frame 60B, the determination in step S108 results in a positive determination, and a transition is made to step S110.

In step S110, the display control unit 31 changes the size of the specifying frame 60B to a size corresponding to the operation instruction for enlarging or reducing the specifying frame 60B. The size of the specified region 52 is also changed by changing the size of the specifying frame 60B. Specifically, coordinate information representing the specifying frame 60B after enlarging or reducing is output to the display control unit 31 from the main control unit 26 as information about the operation instruction. The display control unit 31 displays the specifying frame 60B in a size (position) corresponding to the coordinate information input from the main control unit 26.

Figure 8:
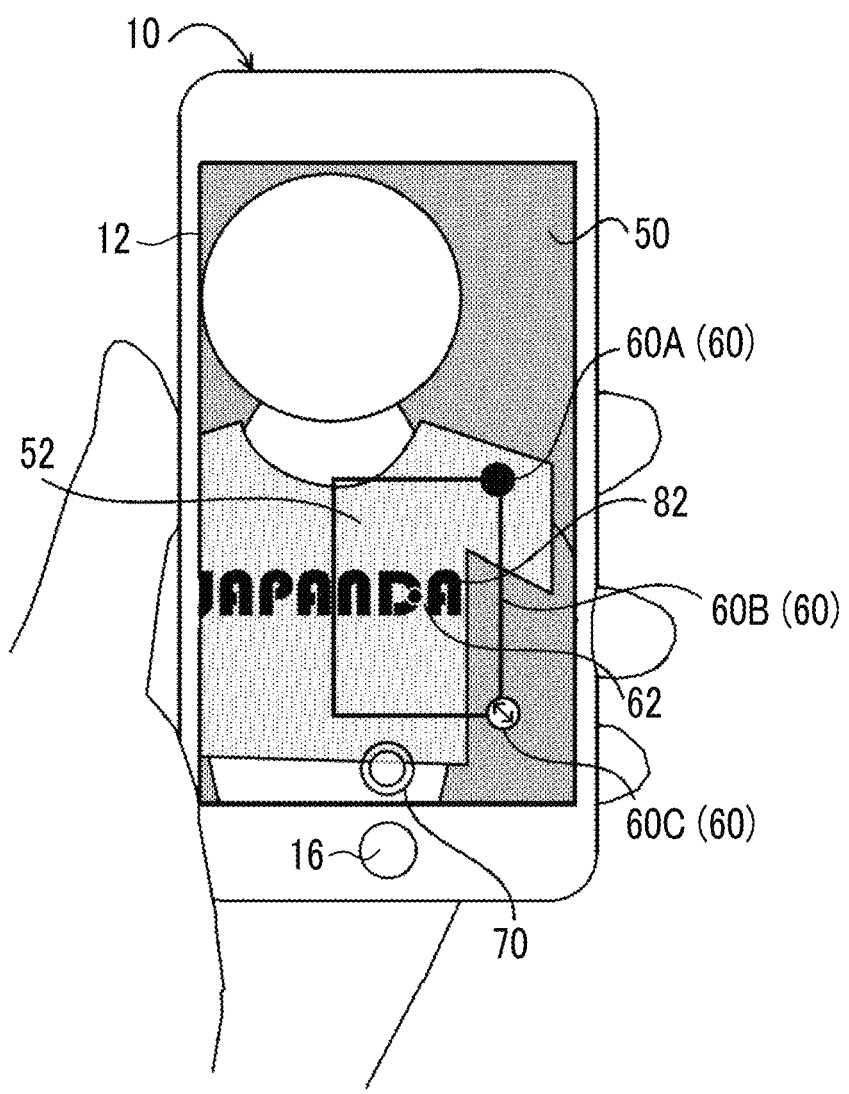
FIG. 8 is a diagram for describing enlarging and reducing of the specifying frame.

FIG. 8 illustrates one example of display of the specifying frame 60B of which the size is changed. In the example illustrated in FIG. 8, a state where the size of the specifying frame 60B is decreased compared to the example illustrated in FIG. 7 is illustrated.

The user U of the present embodiment desires to extract only the text 82 of "PANDA" in the text 82 of "JAPANDA". Thus, as described above, the user U adjusts the specifying frame 60B to a state where only the text 82 of "PANDA" in the text 82 of "JAPANDA" falls in the specifying frame 60B and the text 82 of "JA" is outside the specifying frame 60B as illustrated in FIG. 7. In addition, as described above, the user U adjusts the specifying frame 60B to a state where the reference color designated by the color designation mark 62 is the color of the text 82, in the present example, a state where the color designation mark 62 is overlaid on the text 82, by referring to the color of the indicator 60A. In the example illustrated in FIG. 4, the reference color designated by the color designation mark 62 is different from the color of the text 82 as illustrated by the indicator 60A. Thus, such an example is not preferred. In addition, in the example illustrated in FIG. 8, the text 82 included in the specifying frame 60B is only the text 82 of "NDA". Thus, the text 82 of "PA" is not extracted, and such an example is not preferred. Meanwhile, in the example illustrated in FIG. 7, the text 82 of "PANDA" is included in the specifying frame 60B, and the text 82 of "JA" is not included. In addition, the color designation mark 62 is overlaid on the text 82, and a state where the color of the text 82 is designated by the color designation mark 62 is set as illustrated by the indicator 60A. Thus, such an example is preferred. Accordingly, the user U adjusts the relationship between the display image 50 and the indicator-included specifying frame 60 to the state illustrated in FIG. 7.

In the present embodiment, in a case where adjustment of the position and the size of the specifying frame 60B, the position of the color designation mark 62, and the like is completed, an extraction instruction of the user U for the compositing target image 54 is provided by performing an operation of tapping a shutter button 70 displayed on the touch panel display 12 as a GUI using a finger.

Therefore, next, in step S112, the main control unit 26 determines whether or not the extraction instruction for the compositing target image 54 is received. In a case where the main control unit 26 does not receive the extraction instruction for the compositing target image 54, the determination in step S112 results in a negative determination, and a return is made to step S104 to repeat processing of steps S104 to S110. In a case where the main control unit 26 receives the extraction instruction for the compositing target image 54, the determination in step S112 results in a positive determination, and a transition is made to step S114.

Figure 9:
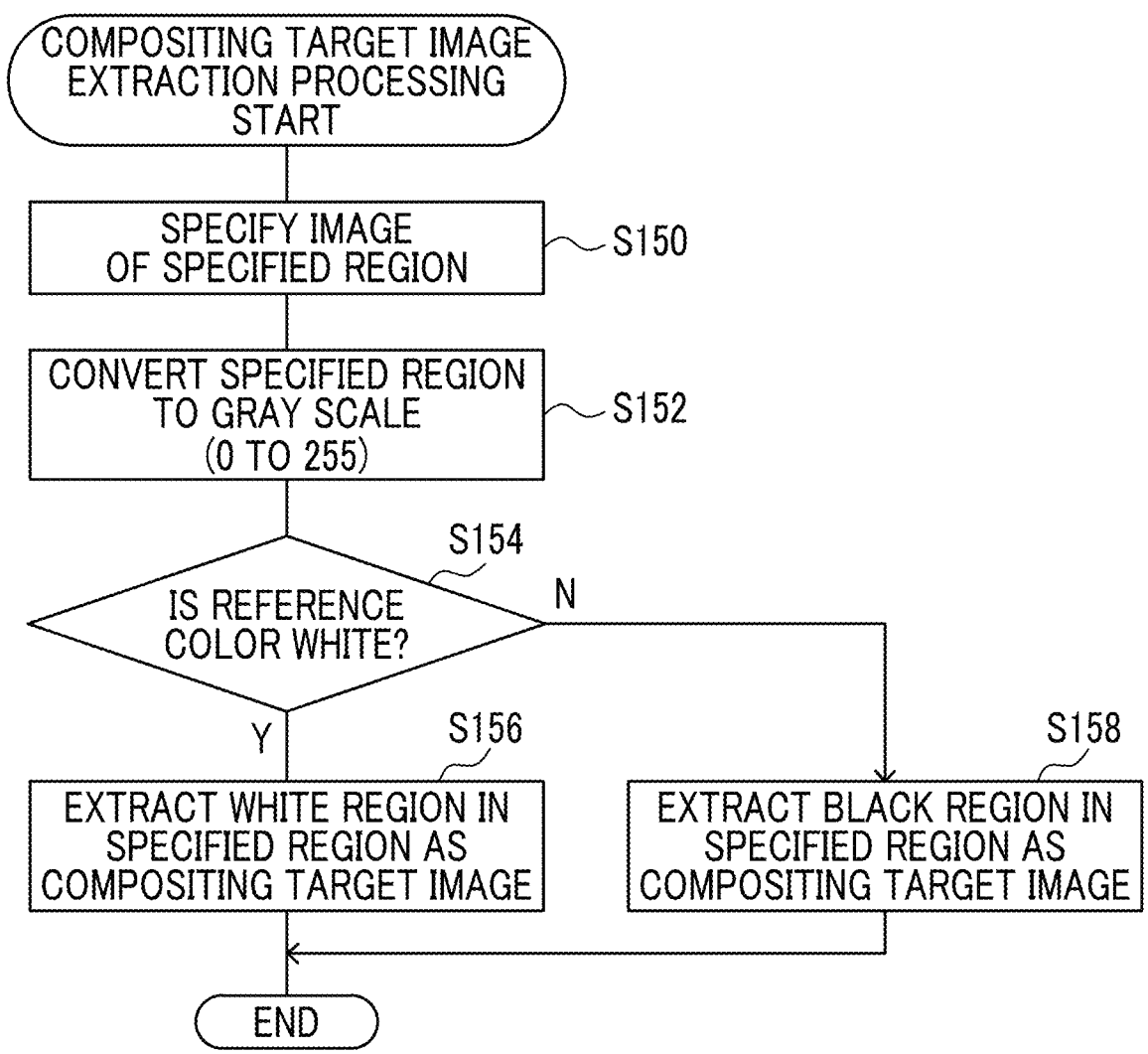
FIG. 9 is a flowchart illustrating one example of compositing target image extraction processing.

In step S114, the compositing target image 54 is extracted from the specified region 52 of the display image 50 by compositing target image extraction processing illustrated in FIG. 9 as one example.

In step S150 illustrated in FIG. 9, the extraction unit 32A specifies the specified region 52 from the display image 50. Specifically, as described above, in a case where the extraction instruction is provided by allowing the user U to operate the shutter button 70, the main control unit 26 outputs the coordinate information corresponding to the position of the specifying frame 60B to the extraction unit 32A. The extraction unit 32A specifies the specified region 52 from the display image 50 based on the coordinate information input from the main control unit 26.

Next, in step S152, the extraction unit 32A converts the entire specified region 52 into a gray scale. Specifically, the extraction unit 32A temporarily performs gradation transformation of the colors of all pixels included in the specified region 52 into pixel values of a gray scale of white to black represented by pixel values of 256 levels of 0 to 255.

A method of performing gradation transformation of the color of each pixel into the gray scale is not particularly limited, and existing technologies can be applied. For example, in a case where the specified region 52 is an RGB image, a gray scale pixel value Gray is obtained from a pixel value of Red (R: red), a pixel value of Green (G: green), and a pixel value of Blue (B: blue) in each pixel using Expression (1) below.

$$Gray = Red \times 0.3 + Green \times 0.59 + Blue \times 0.11 \qquad (1)$$

Figure 10:
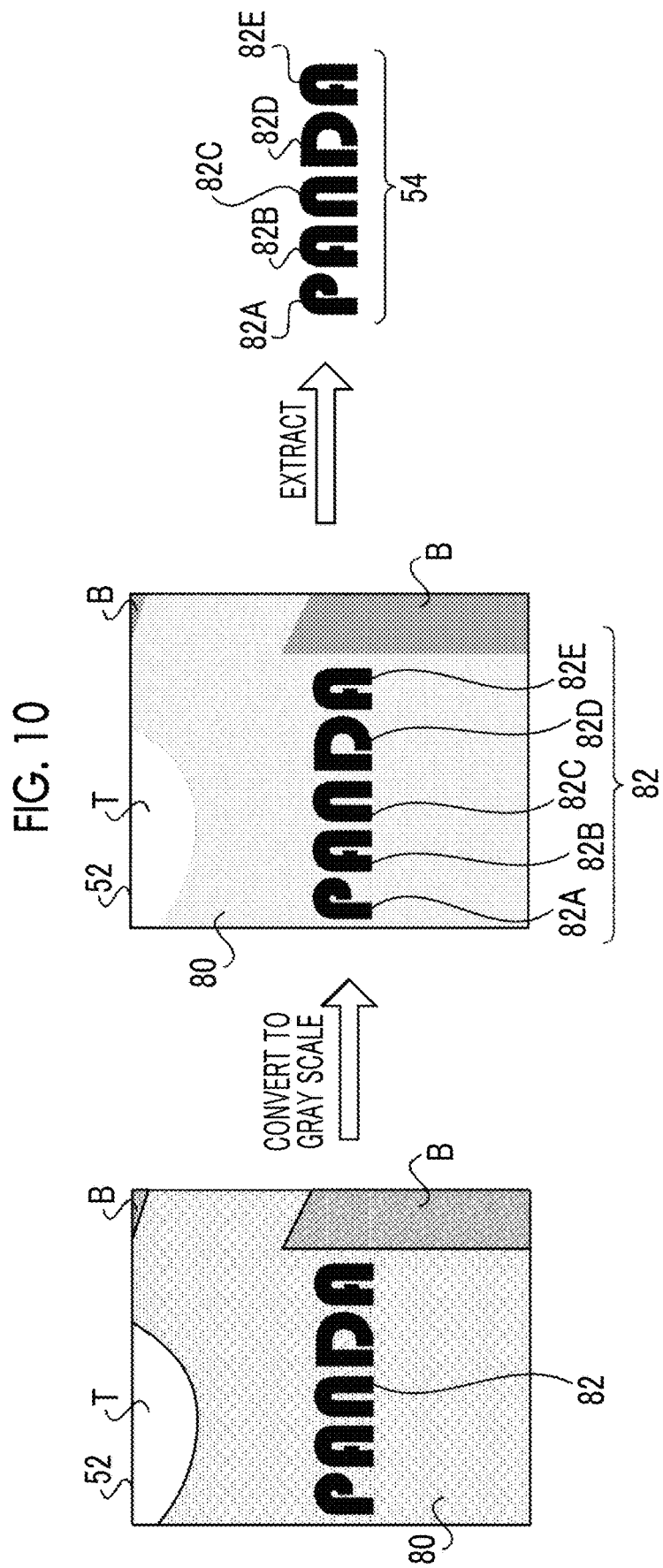
FIG. 10 is a diagram for describing processing of extracting a compositing target image from a specified region.

FIG. 10 illustrates an example in which the image of the specified region 52 is converted into the gray scale. The specified region 52 illustrated in FIG. 10 corresponds to the specified region 52 specified by the indicator-included specifying frame 60 in the state illustrated in FIG. 7. In the specified region 52 illustrated in FIG. 10, the friend T, a background B, the shirt 80, and the text 82 are captured as subjects, and an image of each thereof is included.

Next, in step S154, the extraction unit 32A determines whether or not the reference color is white. As one example, in the present embodiment, a pixel of which the gray scale pixel value in step S152 is 0 to 127 is regarded as a black pixel, and a pixel of which the pixel value is 128 to 255 is regarded as a white pixel. That is, in the present embodiment, the color of the pixel of the gray scale specified region 52 is converted into any of white or black of two values.

In a case where the pixel value of a pixel set as the reference color, specifically, the pixel value of the pixel of the display image 50 surrounded by the color designation mark 62, is any of 128 to 255, the extraction unit 32A determines that the reference color is white. In a case where the reference color is white, the determination in step S154 results in a positive determination, and a transition is made to step S156. In this case, the range within which the pixel value is 128 to 255 in the present embodiment is one example of a reference color range including a numerical value of gradation to which the reference color corresponds according to the present disclosure.

In step S156, the extraction unit 32A extracts the region of the white pixels, that is, pixels of which the pixel values are 128 to 255, in the specified region 52 as the compositing target image 54.

In a case where the pixel value of the pixel set as the reference color, specifically, the pixel value of the pixel of the display image 50 surrounded by the color designation mark 62, is any of 0 to 127, the extraction unit 32A determines that the reference color is black. In a case where the reference color is black, the determination in step S154 results in a negative determination, and a transition is made to step S158. In this case, the range within which the pixel value is 0 to 127 in the present embodiment is one example of the reference color range including the numerical value of gradation to which the reference color corresponds according to the present disclosure.

In step S158, the extraction unit 32A extracts the region of the black pixels, that is, pixels of which the pixel values are 0 to 127, in the specified region 52 as the compositing target image 54.

In the example illustrated in FIG. 10, the pixel value of the pixel of each of a text 82A of "P", a text 82B of "A", a text 82C of "N", a text 82D of "D", and a text 82E of "A" in the gray scale image of the specified region 52 is within the range of 0 to 127. Thus, it is determined that the text 82 is a black pixel. Meanwhile, the pixel value of the pixel of each of the friend T, the background B, and the shirt 80 is within the range of 128 to 255 and is determined as a white pixel.

Accordingly, in the example of the present embodiment, as illustrated in FIG. 10, the extraction unit 32A determines that the reference color is black, and the image of each of the text 82A of "P", the text 82B of "A", the text 82C of "N", the text 82D of "D", and the text 82E of "A" is extracted from the specified region 52 as the compositing target image 54. The extraction unit 32A handles the text 82A of "P", the text 82B of "A", the text 82C of "N", the text 82D of "D", and the text 82E of "A" as one compositing target image 54.

In a case where processing of step S156 or processing of step S158 is finished, the compositing target image extraction processing is finished. By finishing the compositing target image extraction processing, step S114 of the composited imaging processing is finished, and a transition is made to step S116.

In a case where the compositing target image 54 is extracted, in step S116, the imaging unit 11 immediately starts the live view imaging of the selection image 56.

In a case where the live view imaging of the selection image 56 is started, next, in step S118, the compositing unit 32B composites the extracted compositing target image 54 in the selection image 56. In the present embodiment, an image other than the compositing target image 54 in the specified region 52 is handled as a transparent image.

Next, in step S120, the display control unit 31 performs the live view display of the selection image 56 in which the compositing target image 54 is composited on the touch panel display 12.

Figure 11:
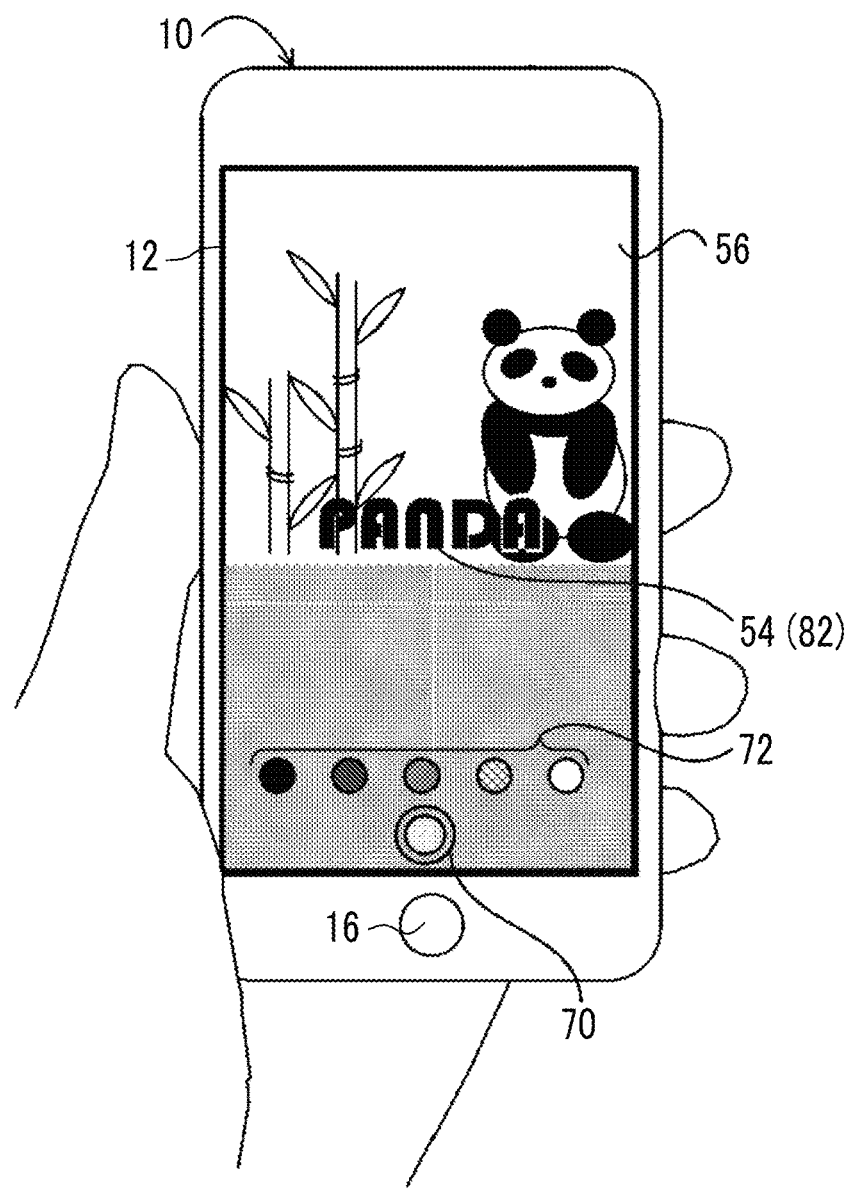
FIG. 11 is a diagram illustrating a state where live view display of a selection image composited with a text that is the compositing target image is performed.

FIG. 11 illustrates a state where the live view display of the selection image 56 composited with the text 82 which is the compositing target image 54 is performed. As illustrated in FIG. 11, in the case of performing the live view display of the selection image 56 in which the compositing target image 54 is composited, the display control unit 31 displays the text 82 which is the compositing target image 54 at the center of the selection image 56, that is, the center of the display screen of the touch panel display 12, in an initial state. Furthermore, as illustrated in FIG. 11, for example, the display control unit 31 displays the shutter button 70 and a color palette 72 at a lower position on the display screen of the touch panel display 12 as a GUI. As will be described later, the color palette 72 is an operation button used for changing the color of the compositing target image 54. The shutter button 70 is an operation button for inputting the image storage instruction and is an operation button for storing the selection image 56 in which the compositing target image 54 is composited as a composite image.

The user U decides the composition of the selection image 56 and a relative positional relationship between the image of the subject and the compositing target image 54 in the selection image 56 while seeing the live view display of the selection image 56 in which the compositing target image 54 is composited.

Specifically, as illustrated in FIG. 11, the user U considers imaging a composite photograph in which the text 82 of "PANDA" and the "panda" are combined. Thus, the user U adjusts the position and the direction of the portable terminal 10 such that the "panda" is captured as the subject of the selection image 56. The position, the size, the angle of view, and the like of the "panda" in the selection image 56 are adjusted. By performing such an operation, the user U decides the composition of the selection image 56.

The user U decides a relative positional relationship between the "panda", which is the subject of the selection image 56, and the text 82, which is the compositing target image 54, in parallel with decision of the composition of the selection image 56. At this point, the display position, the display attitude, the display size, the display color, or the like of the text 82 which is the compositing target image 54 is edited.

In step S122, the main control unit 26 determines whether or not to edit the compositing target image 54 in the selection image 56. In a case where the editing instruction of the user U provided by operating the touch panel display 12 is not input in a predetermined time period from a transition to step S122, the determination in step S122 results in a negative determination, and a transition is made to step S126. In a case where the editing instruction of the user U provided by operating the touch panel display 12 is input in the predetermined time period from the transition to step S122, the determination in step S122 results in a positive determination, and a transition is made to step S124.

In step S124, the image processing unit 32 edits the compositing target image 54 in the selection image 56 in accordance with the content of the editing instruction. FIG. 12 to FIG. 15 illustrate the compositing target image 54 corresponding to the editing instruction.

Figure 12:
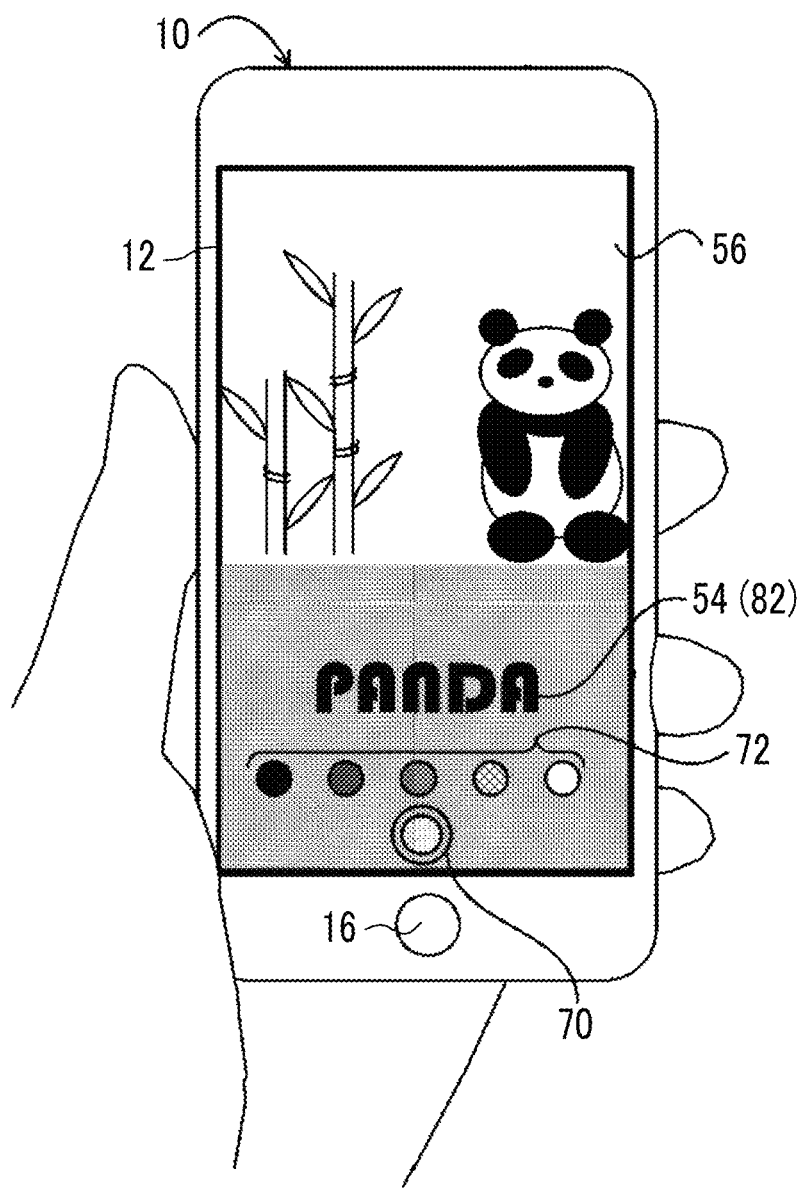
FIG. 12 is a diagram illustrating one example of a case of moving a display position of the text which is the compositing target image.

FIG. 12 illustrates one example of a case where the display position of the text 82 which is the compositing target image 54 is moved. In the example illustrated in FIG. 12, one example of a state where the image processing unit 32 moves the display position of the text 82 downward (closer to the operation switch 16) is illustrated. In a case where the user U provides the editing instruction for moving the display position, a gesture of sliding a finger in a desired direction of movement in a state where the text 82 is touched using one finger on the touch panel display 12 is performed.

Figure 13:
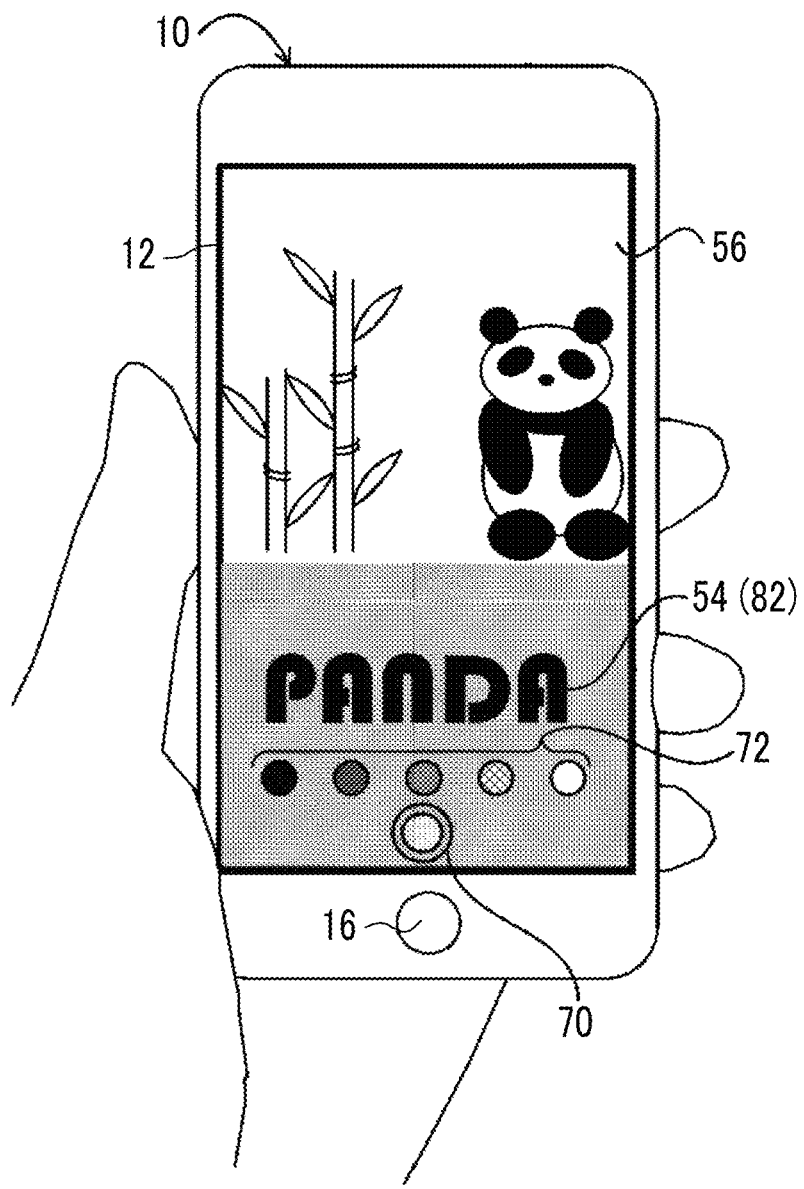
FIG. 13 is a diagram illustrating one example of a case of increasing a display size of the text which is the compositing target image.

FIG. 13 illustrates one example of a case where the display size of the text 82 which is the compositing target image 54 is increased. In a case where the user U provides the editing instruction for increasing or decreasing the display size, for example, a gesture of pinching out or pinching in is performed. In a case where pinching out is performed in a state where the top and the bottom or the left and the right of the text 82 are touched using two fingers, the display size of the text 82 is increased. In a case where pinching in is performed, the display size of the text 82 is decreased.

Figure 14:
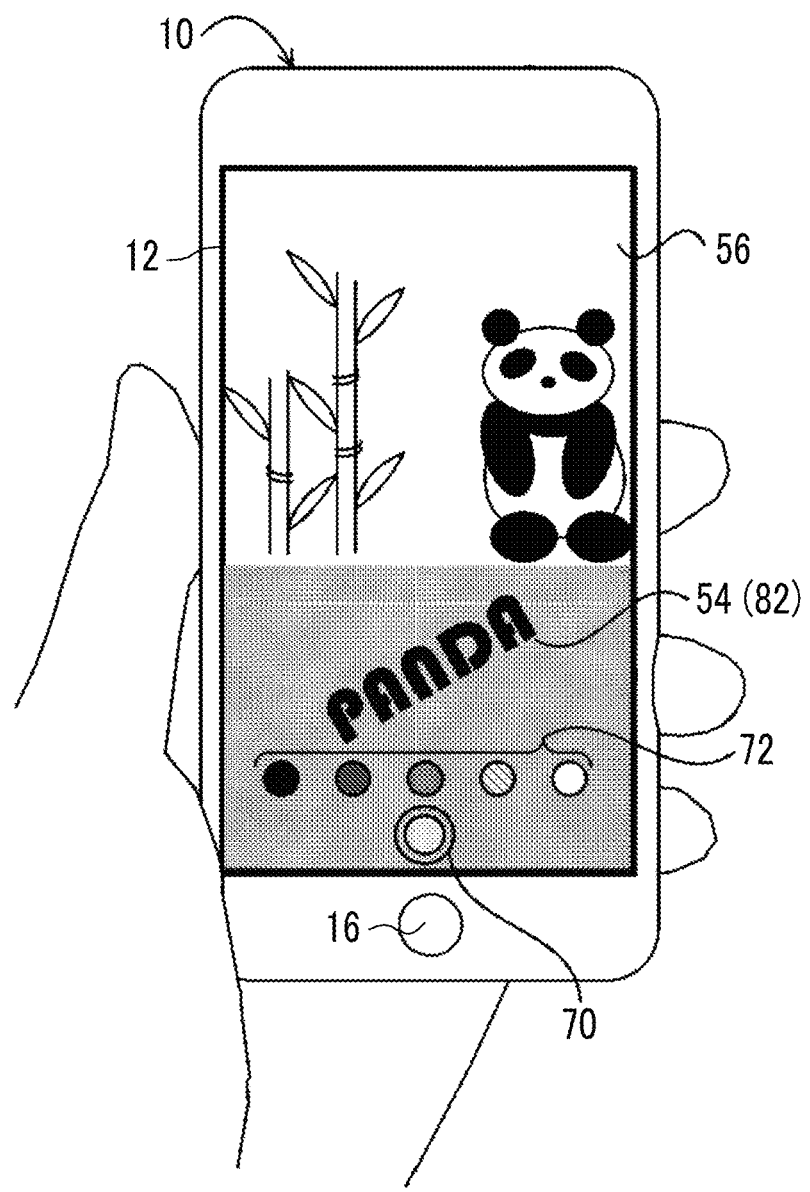
FIG. 14 is a diagram illustrating one example of a case of rotating a display attitude of the text which is the compositing target image.

FIG. 14 illustrates one example of a case where the display attitude of the text 82 which is the compositing target image 54 is rotated. In a case where the user U provides the editing instruction for rotating the display attitude, a gesture of rotating two fingers while maintaining an interval between the two fingers in a state where the top and the bottom or the left and the right of the text 82 are touched using the two fingers on the touch panel display 12 is performed.

Figure 15:
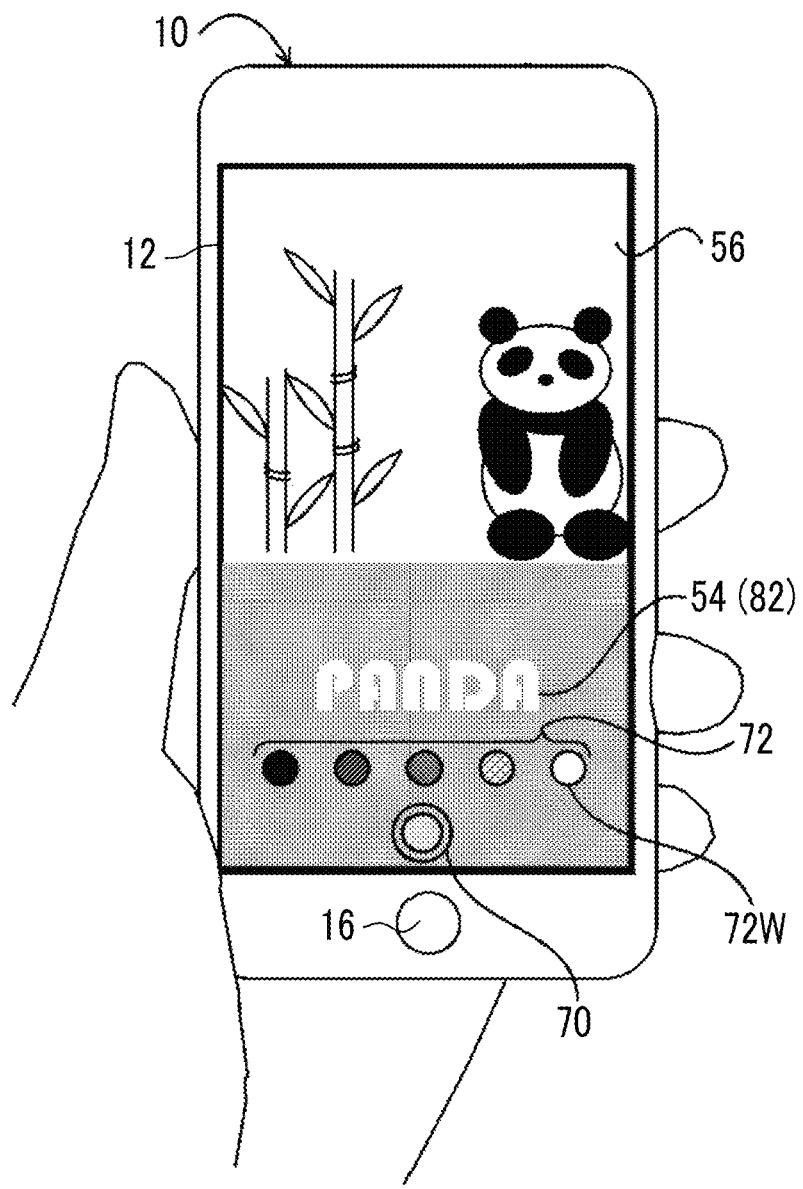
FIG. 15 is a diagram illustrating one example of a case of changing a color of the text which is the compositing target image.

FIG. 15 illustrates one example of a case where the color of the text 82 which is the compositing target image 54 is changed. As illustrated in FIG. 15 and the like, a plurality of colors are arranged in the color palette 72. In a case where the user U provides an editing instruction for changing the color of the text 82, for example, a gesture of tapping a desired color from the plurality of colors arranged in the color palette 72 using a finger is performed. In the example illustrated in FIG. 15, a state where the color of the text 82 is changed to white by the user U providing an editing instruction of tapping white 72W arranged in the color palette 72 using a finger is illustrated.

A form of changing the color of the text 82 which is the compositing target image 54 using the color palette 72 in the present embodiment is described. However, a method of changing the compositing target image 54 is not limited to a method using the color palette 72. For example, a form of displaying a color change button (not illustrated) on the selection image 56 and changing between a plurality of predetermined colors such as white and black, white and red, or white, black, and red in accordance with the number of taps of the color change button in a case where the user U taps the color change button using a finger may be available. For example, the color change of the compositing target image 54 is performed for the purpose of avoiding the compositing target image 54 that is difficult to see due to an overlap in hue between the color of the compositing target image 54 and the color of the background part of the selection image 56. Alternatively, the color change may be performed for the purpose of changing the color of the compositing target image 54 in accordance with the color of the background based on the sensitivity or the like of the user U.

The main control unit 26 receives such a gesture performed on the compositing target image 54 as the editing instruction. The main control unit 26 outputs information about the received editing instruction to the compositing unit 32B. The compositing unit 32B edits the compositing target image 54 in the selection image 56 based on the information about the editing instruction input from the main control unit 26.

In a case where editing of the compositing target image 54 is finished, the user U taps the shutter button 70 using a finger. In a case where the shutter button 70 is tapped, the main control unit 26 receives a tap operation as a storage instruction for the composite image.

In step S126, the main control unit 26 determines whether or not the storage instruction for the composite image is received. In a case where the main control unit 26 does not receive the storage instruction for the composite image, the determination in step S126 results in a negative determination, and a return is made to step s122 to repeat processing of steps S122 and S124.

In a case where the main control unit 26 receives the storage instruction for the composite image, the determination in step S126 results in a positive determination, and a transition is made to step S128.

The main control unit 26 outputs information about the received storage instruction for the composite image to the compositing unit 32B. In a case where the information about the storage instruction for the composite image is input into the image processing unit 32 from the main control unit 26, the image processing unit 32 confirms the selection image 56 captured at the timing of the tap operation performed on the shutter button 70 and confirms the display position and the like of the compositing target image 54 in the confirmed selection image 56. The compositing unit 32B composites the compositing target image 54 of which the display position and the like are confirmed in the confirmed selection image 56 and outputs the composite image to the image memory 17A as a composite image for storage.

Next, in step S128, the image processing unit 32 stores the composite image. Specifically, the image processing unit 32 stores the composite image by performing compression processing on the composite image for storage output to the image memory 17A and recording the composite image after compression processing in the user region 28 of the storage device 18 or the memory card 29.

Next, in step S130, the main control unit 26 determines whether or not to finish the composited imaging mode. In the present embodiment, in a case where the main control unit 26 receives an operation instruction provided by the user U operating the operation switch 16 or the like for finishing the composited imaging mode, the composited imaging mode is finished. Thus, in a case where the main control unit 26 does not receive the operation instruction for finishing the composited imaging mode, the determination in step S130 results in a negative determination, and a return is made to step S100 to repeat processing of steps S100 to S128. In a case where the main control unit 26 receives the operation instruction for finishing the composited imaging mode, the determination in step S130 results in a positive determination, and the composited imaging mode is finished.

Figure 16:
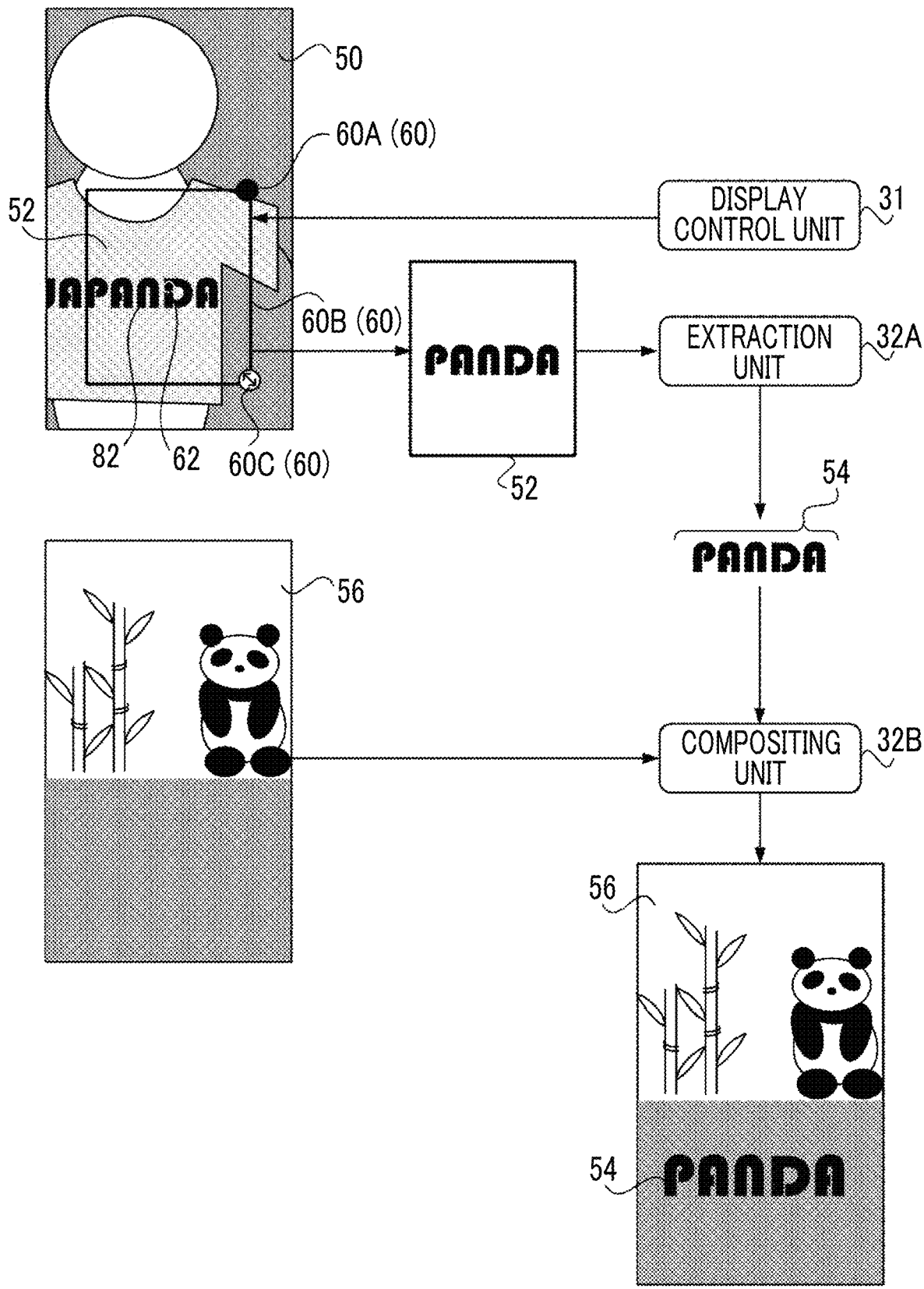
FIG. 16 is a diagram summarizing the composited imaging processing in the portable terminal of an embodiment.

FIG. 16 illustrates a diagram summarizing the composited imaging processing in the portable terminal 10 of the present embodiment. As illustrated in FIG. 16, the portable terminal 10 comprises the display control unit 31, the extraction unit 32A, and the compositing unit 32B. The display control unit 31 displays the specifying frame 60B for specifying the specified region 52, which is a partial region in the display image 50 displayed on the touch panel display 12, and the color designation mark 62 for designating the reference color from the colors included in the image of the specified region 52 in the specifying frame 60B in superposition with the display image 50. The extraction unit 32A extracts an image corresponding to the reference color designated by the color designation mark 62 from the image of the specified region 52 in the specifying frame 60B as the compositing target image 54. The compositing unit 32B generates the composite image in which the compositing target image 54 is composited in the selection image 56 selected by the user U.

That is, in the portable terminal 10 of the present embodiment, a desired composite image of the user U can be generated by designating the color of the image desired to be extracted from the specified region 52, that is, the image desired to be set as the compositing target image 54, as the reference color by the color designation mark 62 in the specifying frame 60B.

According to the portable terminal 10 of the present embodiment, in the case of designating an image to be set as the compositing target image 54, the user U may superpose the color designation mark 62 on the color of the image desired to be set as the compositing target image 54. Thus, the user U does not need to directly designate the image to be set as the compositing target image 54 from a plurality of images included in the display image 50. For example, the user U does not need to touch the region of the image to be set as the compositing target image 54 using one finger or perform a gesture such as surrounding the entire region by sliding one finger. Thus, according to the portable terminal 10 of the present embodiment, since the image to be set as the compositing target image 54 can be designated without performing an operation on the touch panel display 12, for example, the image to be set as the compositing target image 54 can be designated even using one hand holding the portable terminal 10. Accordingly, according to the portable terminal 10 of the present embodiment, the operability is further improved, and composited imaging corresponding to various scenes can be performed.

According to the portable terminal 10 of the present embodiment, even in a case where the compositing target image 54 has a complex shape, the compositing target image 54 can be appropriately extracted from the specified region 52 by a simple operation.

Accordingly, according to the portable terminal 10 of the present embodiment, creation of the composite image is facilitated, and the operability of the user U related to compositing is improved.

In the portable terminal 10 of the present embodiment, the relative positional relationship between the specifying frame 60B and the color designation mark 62 is predetermined. Thus, in the portable terminal 10 of the present embodiment, since both of the position of the specifying frame 60B and the position of the color designation mark 62 may not be designated by the user U, the operability of the user U is further improved.

In the portable terminal 10 of the present embodiment, the specifying frame 60B can be enlarged and reduced. In addition, in the portable terminal 10 of the present embodiment, the specifying frame 60B can be moved. For example, the position of the compositing target image 54 with respect to the display image 50 may inevitably be a biased position due to restriction of an imaging position. In addition, for example, images not desired to be included in the compositing target image 54 may be spread in the display image 50. Even in such a case, since the specifying frame 60B can be enlarged and reduced in the portable terminal 10 of the present embodiment, a desired image desired to be set as the compositing target image 54 by the user U can be appropriately included within the range of the specifying frame 60B, that is, the specified region 52, in the display image 50. In addition, in the portable terminal 10 of the present embodiment, since the specifying frame 60B can be moved, a desired image desired to be set as the compositing target image 54 by the user U can be appropriately included within the range of the specifying frame 60B, that is, the specified region 52, in the display image 50.

In the portable terminal 10 of the present embodiment, the color of the display image 50 surrounded by the color designation mark 62 is set as the reference color. In the portable terminal 10 of the present embodiment, an image having the reference color is displayed inside the color designation mark 62. Thus, the user U can check the designated reference color.

In the portable terminal 10 of the present embodiment, the reference color is displayed in the indicator 60A having a larger area than the color designation mark 62. The user U can check the reference color designated by the color designation mark 62 from the indicator 60A. Thus, for example, even in a case where the color designation mark 62 is small, the reference color can be easily checked.

In the portable terminal 10 of the present embodiment, gradation of the entire specified region 52 of the specifying frame 60B is quantified, and an image in which the numerical value of gradation is within the reference color range including the numerical value of gradation corresponding to the reference color is extracted as the compositing target image 54. In the portable terminal 10 of the present embodiment, since the compositing target image 54 can be extracted from the specified region 52 based on the numerical value obtained by quantifying gradation, the compositing target image 54 can be easily extracted in the portable terminal 10, and a processing load in the portable terminal 10 can be reduced.

Modification Example 1

In the embodiment, a form in which the reference color range in a case where the extraction unit 32A extracts the compositing target image 54 from the specified region 52 is predetermined is described. Meanwhile, in the present modification example, a form in which the reference color range is set by the user U will be described.

Figure 17:
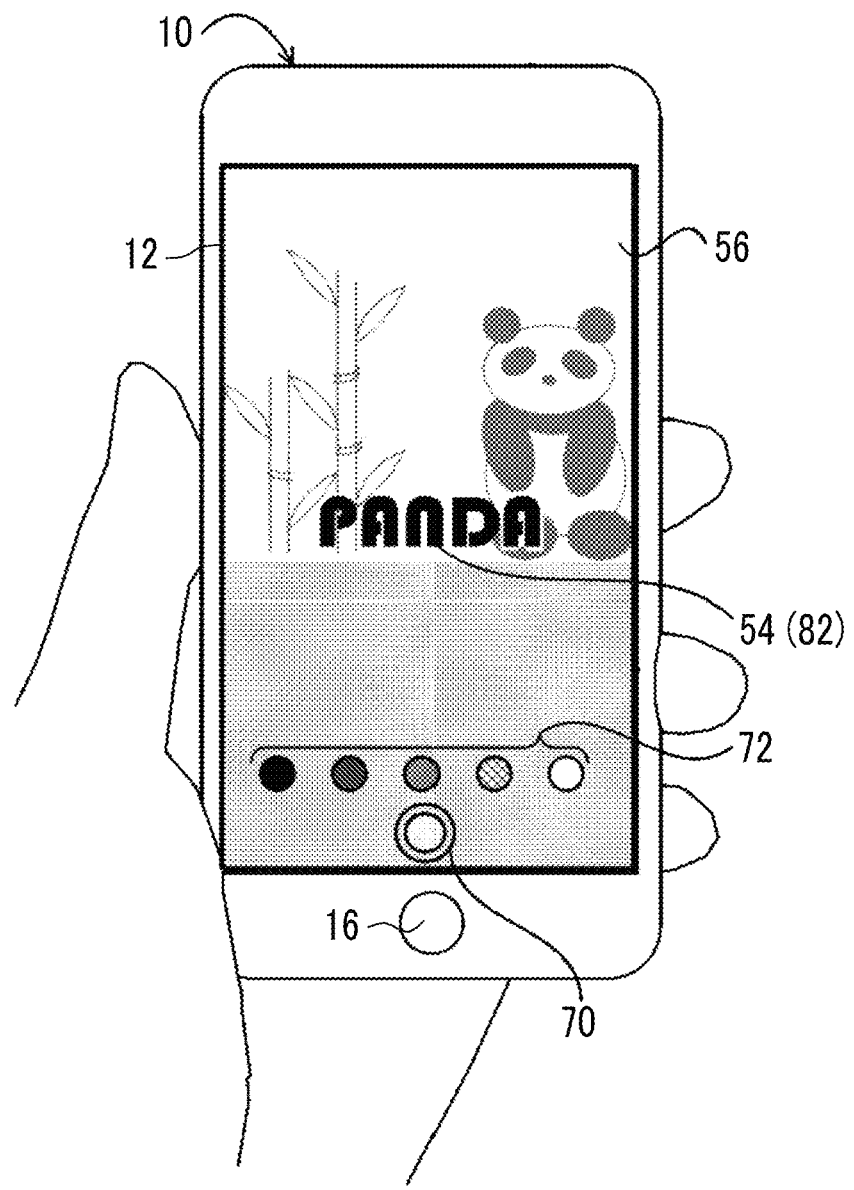
FIG. 17 is a diagram for describing Modification Example 1.

FIG. 17 illustrates one example of a state where the display control unit 31 performs the live view display of the selection image 56 in which the compositing target image 54 is composited on the touch panel display 12 in step S120 of the composited imaging processing. In the example illustrated in FIG. 17, in order to make the compositing target image 54 (text 82) easy to see, one semi-transparent background image is interposed between the selection image 56 and the compositing target image 54 by the display control unit 31.

Figure 18:
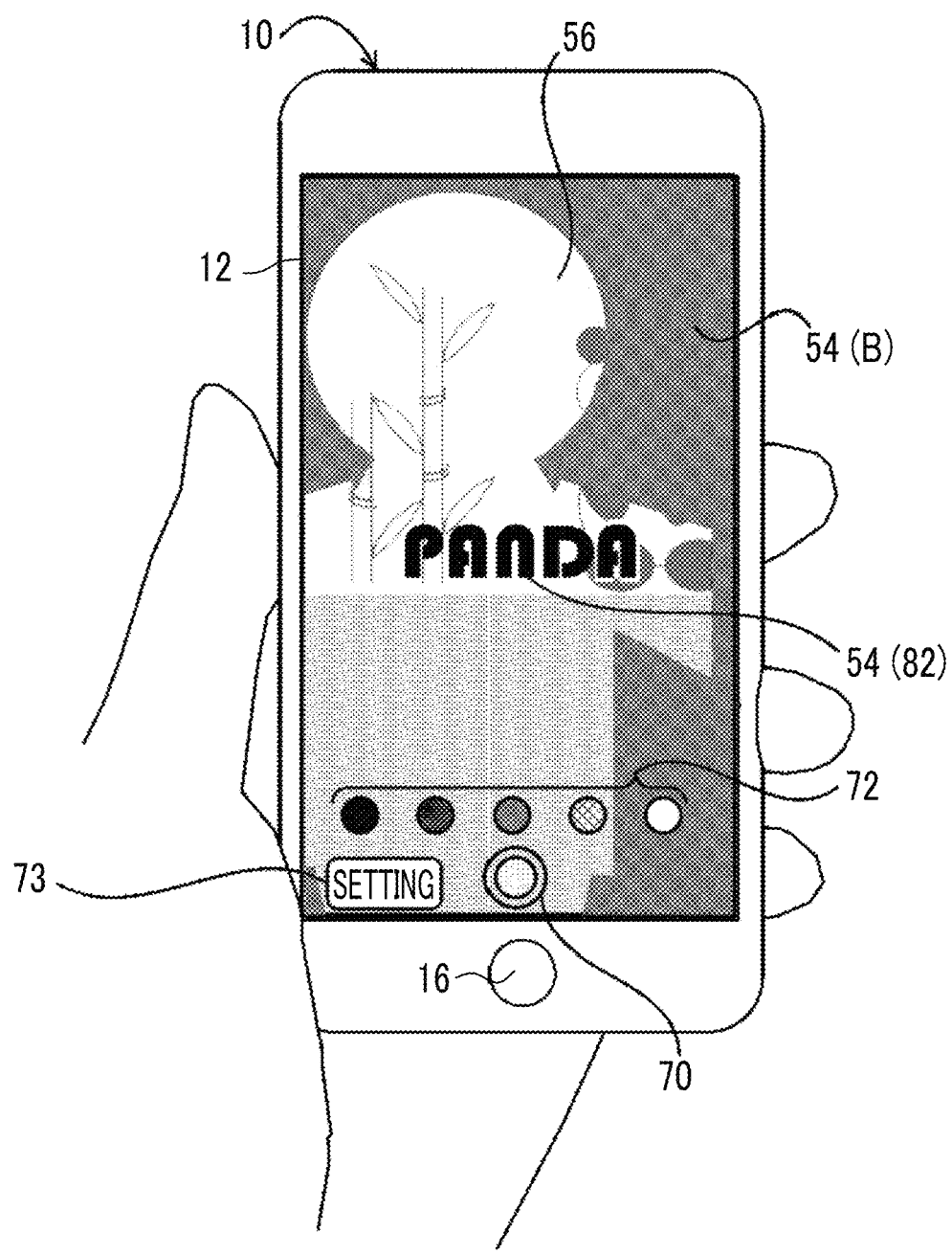
FIG. 18 is a diagram for describing Modification Example 1.

In the specified region 52, in a case where a difference in contrast among the images (refer to FIG. 10) of the text 82, the friend T, the background B, the shirt 80, and the polka dot 84 is relatively small, the extraction unit 32A may not extract only the text 82 unlike FIG. 17. For example, in a case where the pixel value of the pixel of the gray scale background B is a value of any of 0 to 127, the extraction unit 32A determines that the color of the pixel of the background B is the same black as the reference color. In this case, the extraction unit 32A extracts the text 82 and the background B as the compositing target image 54. Thus, as illustrated in FIG. 18, the display control unit 31 displays the selection image 56 in which the text 82 and the background B are composited as the compositing target image 54 on the touch panel display 12.

Figure 19:
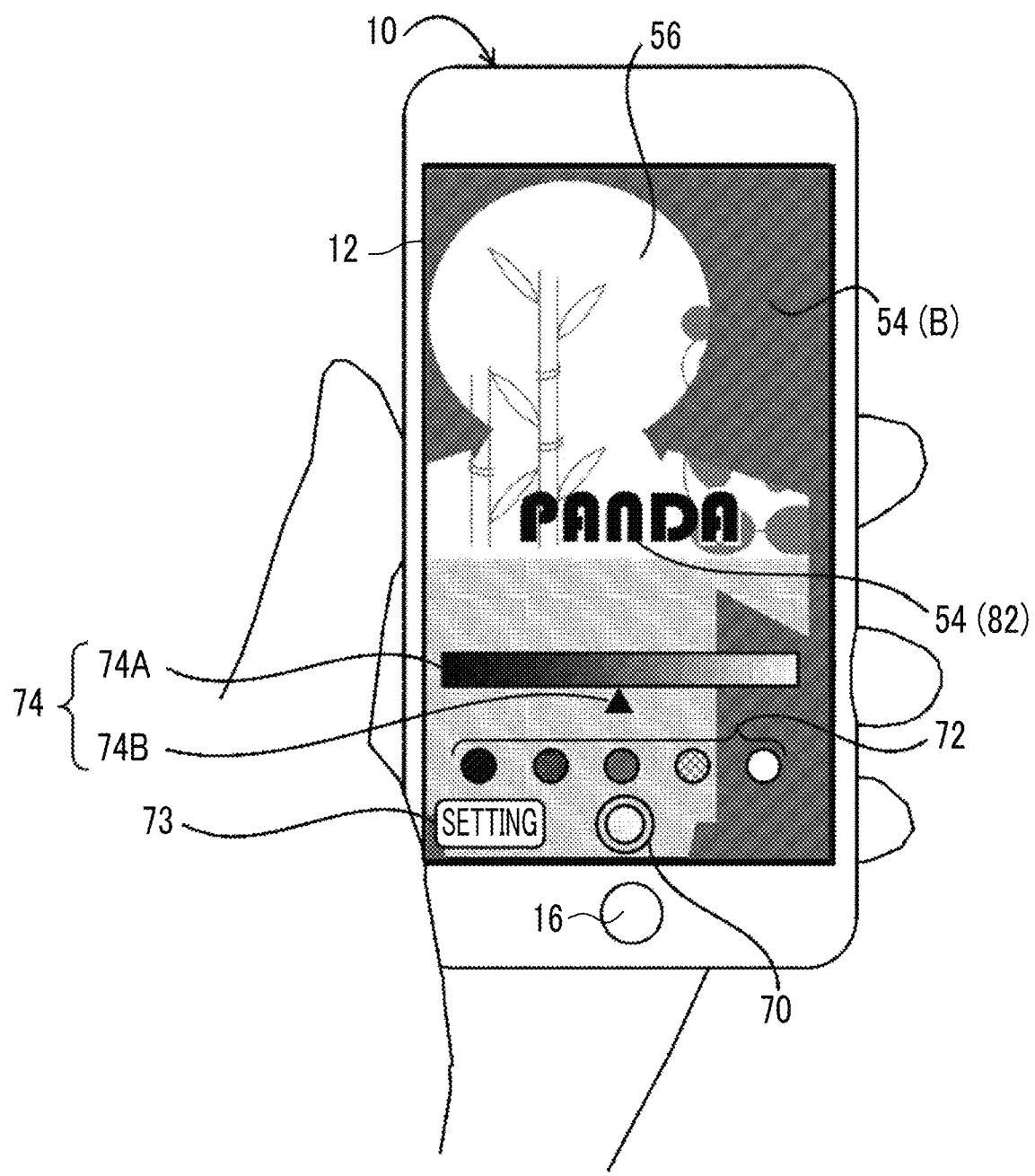
FIG. 19 is a diagram for describing Modification Example 1.

In such a case, in the present modification example, the user U can exclude the background B from the compositing target image 54 by setting the reference color range by setting a threshold value used as a boundary of the reference color range, in other words, a threshold value for determining whether the reference color is white or black. In the present modification example, as illustrated in FIG. 18, for example, the display control unit 31 displays a setting button 73 for setting the threshold value used as the boundary of the reference color range at a lower position on the display screen of the touch panel display 12 as a GUI. By allowing the user U to provide an operation instruction of tapping the setting button 73 using one finger, the display control unit 31 displays a threshold value setting tool 74 as a GUI as illustrated in FIG. 19. The threshold value setting tool 74 includes a slider bar 74A representing colors having pixel values of 0 to 255 and a slider 74B.

The user U changes the position of the slider 74B by performing a gesture of sliding a finger along the slider bar 74A in a state where the user U touches the slider 74B using one finger. In a case where the position of the slider 74B is changed, the extraction unit 32A changes the threshold value used as the boundary of the reference color range to a color indicated by the slider bar 74A corresponding to the changed position, specifically, the pixel value of the pixel of the slider bar 74A designated by the slider 74B. In the example illustrated in FIG. 19, as the position of the slider 74B is moved to the right side, the threshold value used as the boundary of the reference color range is increased and approaches white. As the position of the slider 74B is moved to the left side, the threshold value is decreased and approaches black.

Figure 20:
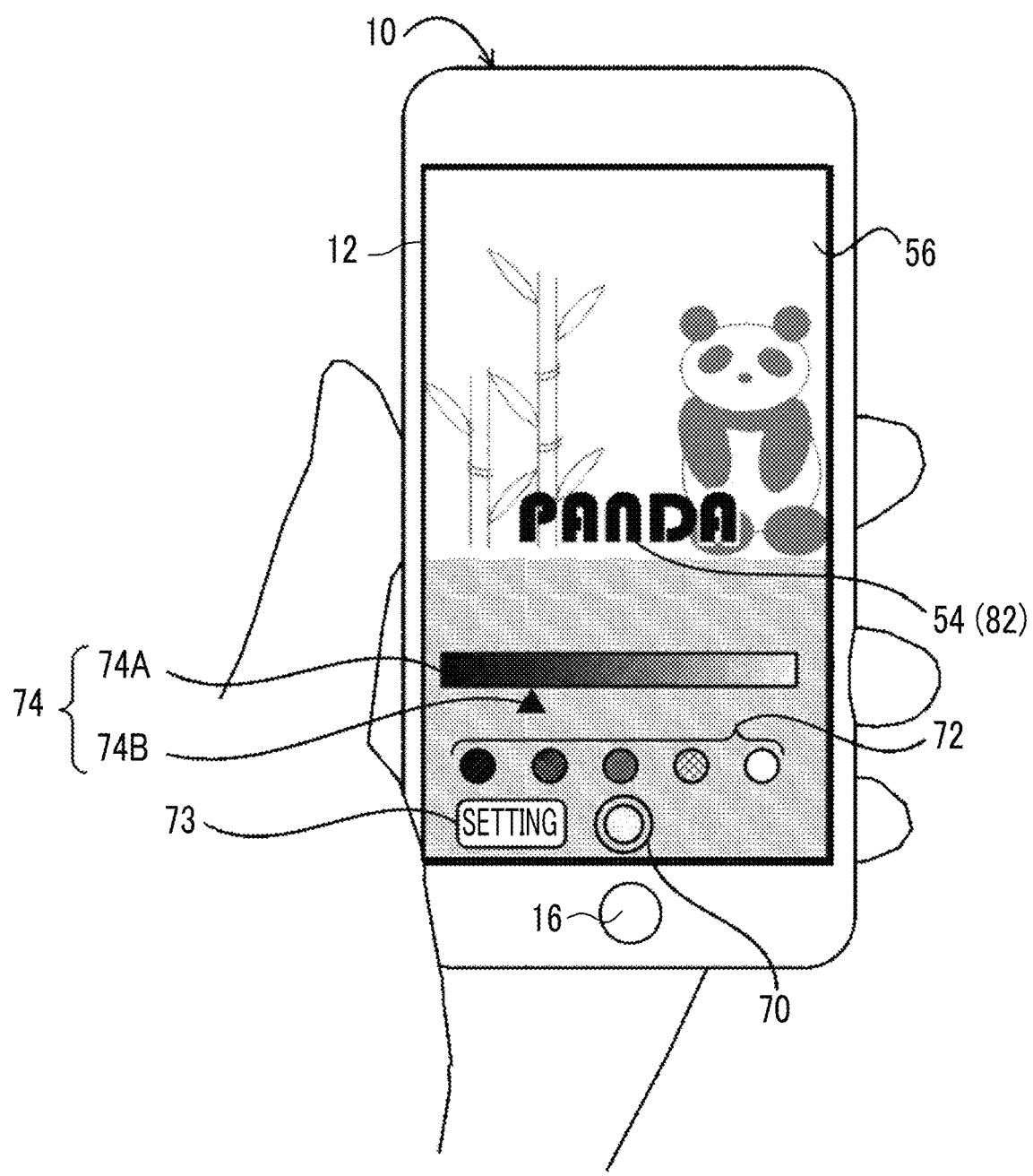
FIG. 20 is a diagram for describing Modification Example 1.

In the case of excluding the background B from the compositing target image 54, the user U moves the slider 74B between the color of the background B and the color of the text 82 as illustrated in FIG. 20. By allowing the user U to move the slider 74B, the threshold value used as the boundary of the reference color range is set to a value between the pixel value of the pixel of the background B and the pixel value of the pixel of the text 82. In this state, the portable terminal 10 can set a state where only the text 82 is included in the compositing target image 54 as illustrated in FIG. 20 by performing the compositing target image extraction processing (refer to FIG. 9) again.

In the present modification example, the threshold value used as the boundary of the reference color range, in other words, a threshold value used as a boundary of contrast between the compositing target image 54 and other images, can be set by the user U.

Accordingly, according to the portable terminal 10 of the present modification example, only an image desired by the user U can be extracted from the specified region 52 as the compositing target image 54 by a simple operation. In addition, since the user U can set the threshold value used as the boundary of the reference color range while seeing the color of the slider bar 74A, the threshold value can be more intuitively set.

The threshold value setting tool 74 is not limited to a form of including the slider bar 74A and the slider 74B. For example, the threshold value setting tool 74 may have a form of including a color space and a pointer designating coordinates of the color space. In this case, a pixel value corresponding to the coordinates of the color space designated by the user U using the pointer is set as the threshold value used as the boundary of the reference color range.

In the embodiment and the present modification example, a form of converting the gray scale pixel into two values and setting one value as the reference color range is described. However, the reference color range is not limited to the present form. For example, a form of setting a range within which the pixel value of the reference color is included as the reference color range using three or more values may be available. In addition, for example, a form of setting a predetermined range from the pixel value of the pixel of the reference color, specifically, a range of ±20 of the pixel value of the reference color, is set as the reference color range may be available.

Modification Example 2

In each form above, a form of designating the color of the text 82 desired to be composited as the reference color using the color designation mark 62 is described. However, designation of the color of the text 82 as the reference color may not be appropriately performed, and the compositing target image 54 may not be appropriately extracted. Regarding such a case, a modification example of a method of designating the color of the text 82 as the reference color will be described in the present modification example.

Figure 21:
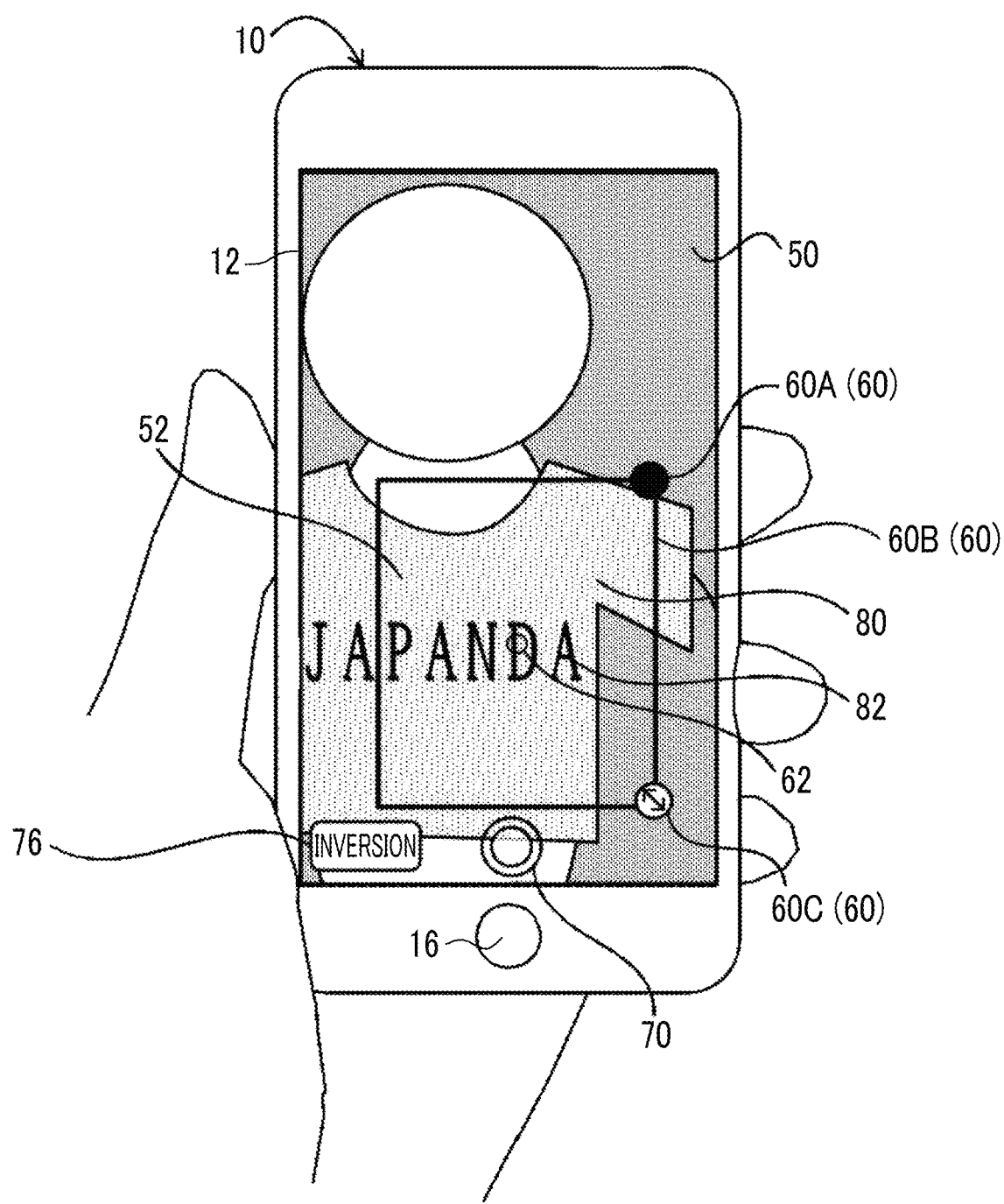
FIG. 21 is a diagram for describing Modification Example 2.
Figure 22:
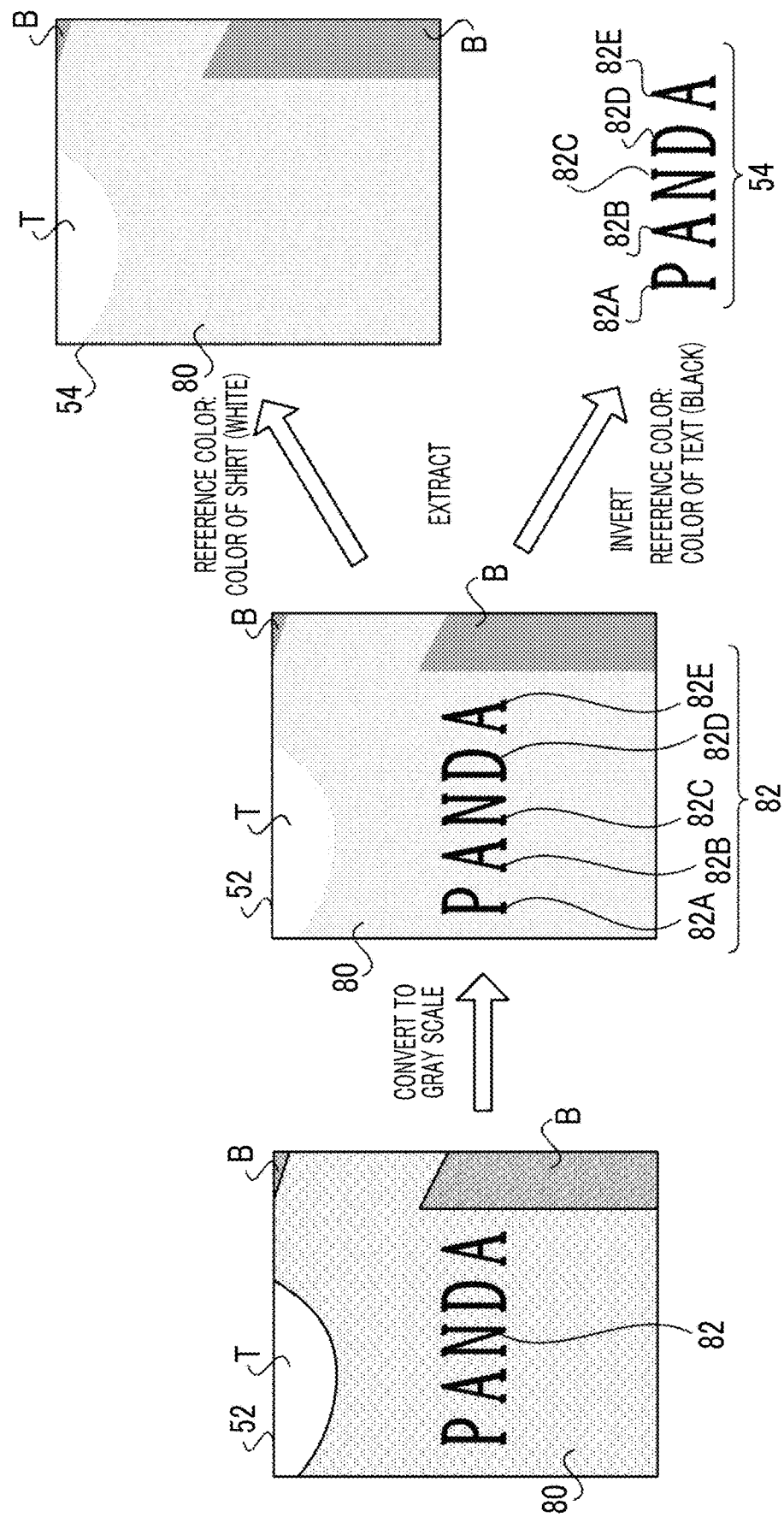
FIG. 22 is a diagram for describing Modification Example 2.

For example, as illustrated in FIG. 21, in a case where the text 82 is smaller than the color designation mark 62 such that the text 82 is thin, the proportion of the text 82 in the display image 50 surrounded by the color designation mark 62 is smaller than other images (in the example in FIG. 21, the shirt 80). In a case where a plurality of images are included in the display image 50 surrounded by the color designation mark 62, the color of the pixel of the shirt 80 is the reference color in a case where the color of an included image having the highest proportion is set as the reference color. As described above, since the extraction unit 32A determines that the color of the pixel of the shirt 80 is white, the reference color is white. Thus, as illustrated in FIG. 22, the extraction unit 32A extracts each of the friend T, the background B, and the shirt 80, which are determined as being white, as the compositing target image 54.

In such a case, in the present modification example, the user U can set the color of an image desired to be extracted, in the present modification example, the color of the text 82, as the reference color by inverting the reference color. In the present modification example, as illustrated in FIG. 21, for example, the display control unit 31 displays an inversion button 76 for inverting the reference color at a lower position on the display screen of the touch panel display 12 as a GUI. In a case where the user U provides an inversion instruction by tapping the inversion button 76 using one finger, the main control unit 26 receives the inversion instruction and outputs information about the inversion instruction to the extraction unit 32A. In a case where the information about the inversion instruction is input into the extraction unit 32A from the main control unit 26, the extraction unit 32A inverts the color of the reference color determined in step S154 of the compositing target image extraction processing (refer to FIG. 9) and extracts the compositing target image 54 based on the reference color after inversion.

The extraction unit 32A extracts the compositing target image 54 based on the reference color after inversion. In the present modification example, black is the reference color, and the compositing target image 54 is extracted by the extraction unit 32A using the color of the text 82 as the reference color. Thus, as illustrated in FIG. 22, the extraction unit 32A can extract the text 82 as the compositing target image 54.

Accordingly, according to the portable terminal 10 of the present modification example, the compositing target image 54 can be appropriately extracted from the specified region 52 by a simple operation.

A timing at which the extraction unit 32A inverts the reference color is not limited. For example, a form of providing the inversion instruction before providing the extraction instruction for the compositing target image 54 in a case where the text 82 is thin and the user U feels that the color designation mark 62 cannot be easily set on the text 82, or in a case where the user U sees the color displayed in the indicator 60A and feels that the color is different from the color of the text 82 may be available. Alternatively, a form in which the user U who notices that the compositing target image 54 is not a desired image after the live view display of the selection image 56 in which the compositing target image 54 is composited provides the inversion instruction may be available.

In the present modification example, a form of appropriately extracting the compositing target image 54 by inverting the reference color in a case where the compositing target image 54 cannot be appropriately extracted is described. However, a method for appropriately extracting the compositing target image 54 is not limited to the present modification example. For example, a form of inverting a relationship between an image extracted as the compositing target image 54 and an image that is not extracted may be available. In the case of the present modification example, in a case where white is set as the reference color as described above, the extraction unit 32A extracts each of the friend T, the background B, and the shirt 80 and does not extract the text 82. By inverting (changing) a relationship of whether or not to perform extraction, the extraction unit 32A can extract the text 82 and may not extract each of the friend T, the background B, and the shirt 80.

Modification Example 3

In the present modification example, a modification example of the specifying frame 60B of the indicator-included specifying frame 60 will be described. The "frame" of the specifying frame 60B may be a frame that can clearly present the range of the specified region 52.

Figure 23A:
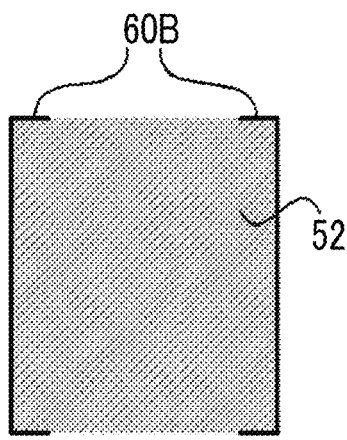
FIG. 23A is a diagram for describing Modification Example 3.
Figure 23B:
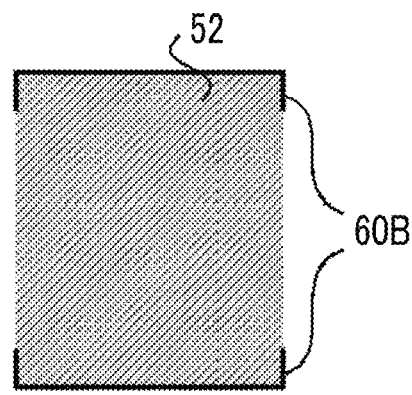
FIG. 23B is a diagram for describing Modification Example 3.
Figure 23C:
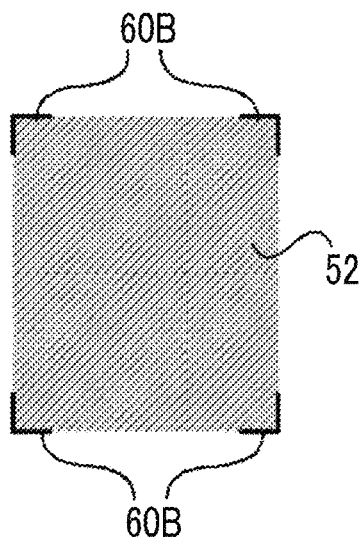
FIG. 23C is a diagram for describing Modification Example 3.

For example, as illustrated in FIG. 23A to FIG. 23C, a part of a line surrounding the specified region 52 may be cut in the specifying frame 60B. The specifying frame 60B illustrated in FIG. 23A and FIG. 23B has a shape of a so-called bracket. Even in the forms illustrated in FIG. 23A and FIG. 23B, the specifying frame 60B clearly presents the range of the specified region 52 as a range provided with hatching by diagonal lines in the drawings. The specifying frame 60B in FIG. 23C has a shape of a so-called corner bracket. Even in the form illustrated in FIG. 23C, the specifying frame 60B clearly presents the range of the specified region 52 as a range provided with hatching by diagonal lines in the drawing.

Figure 23D:
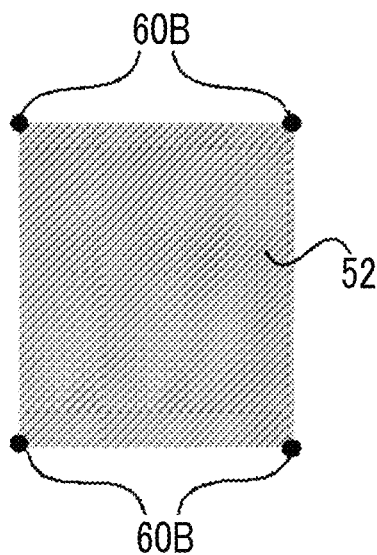
FIG. 23D is a diagram for describing Modification Example 3.

In addition, for example, as illustrated in FIG. 23D, the specifying frame 60B may have a mark shape indicating the position of framing. Even in the form illustrated in FIG. 23D, the specifying frame 60B clearly presents the range of the specified region 52 as a range provided with hatching by diagonal lines in the drawing.

Figure 23E:
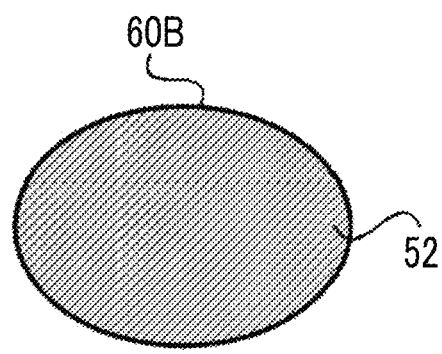
FIG. 23E is a diagram for describing Modification Example 3.
Figure 23F:
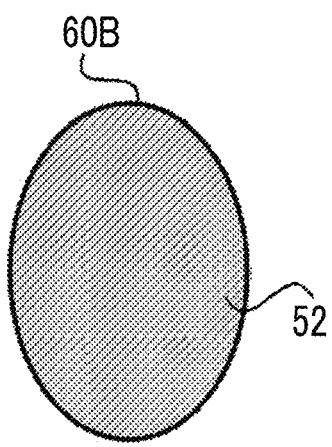
FIG. 23F is a diagram for describing Modification Example 3.

The specifying frame 60B is not limited to a rectangular shape and may have other shapes. For example, as illustrated in FIG. 23E and FIG. 23F, the specifying frame 60B may be a frame having a circular shape.

Modification Example 4

In the present modification example, a modification example of the indicator 60A of the indicator-included specifying frame 60 will be described.

A form of arranging the indicator 60A on the frame of the specifying frame 60B and handling the indicator 60A and the specifying frame 60B as the indicator-included specifying frame 60 as a single unit is described above. Alternatively, the indicator 60A and the specifying frame 60B may be separately handled.

Figure 24A:
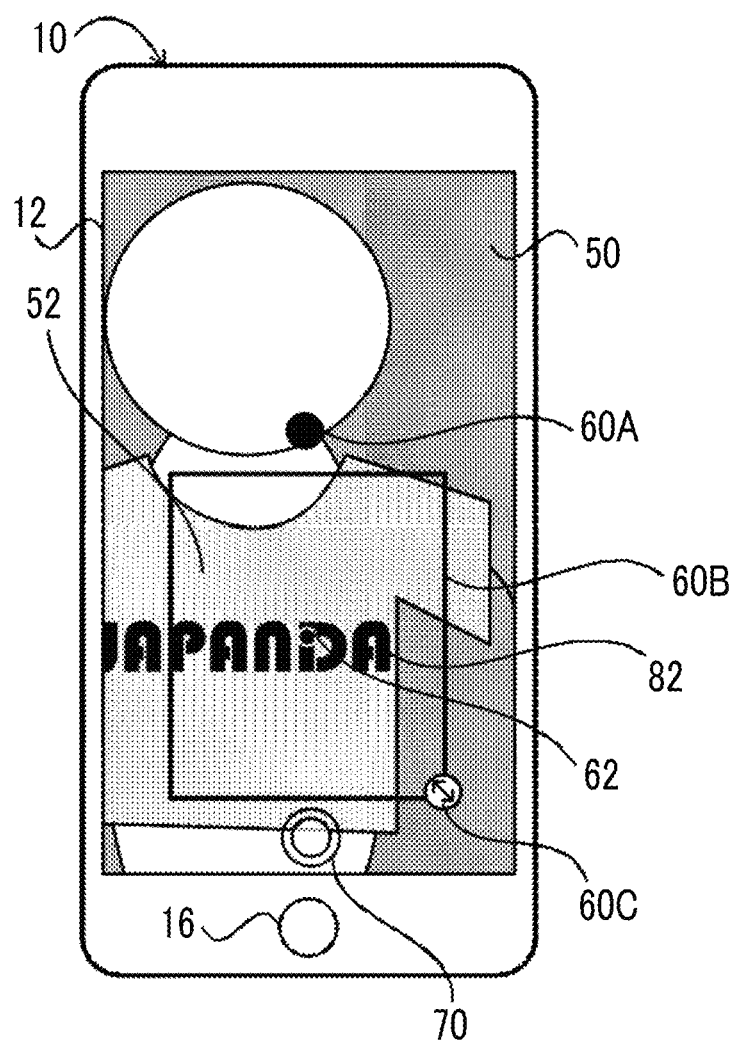
FIG. 24A is a diagram for describing Modification Example 4.

In the case of separately handling the indicator 60A and the specifying frame 60B, for example, as illustrated in FIG. 24A, the display control unit 31 may display the indicator 60A at a position separated from the specifying frame 60B such that the indicator 60A is displayed at a position above the specifying frame 60B in the display image 50.

Figure 24B:
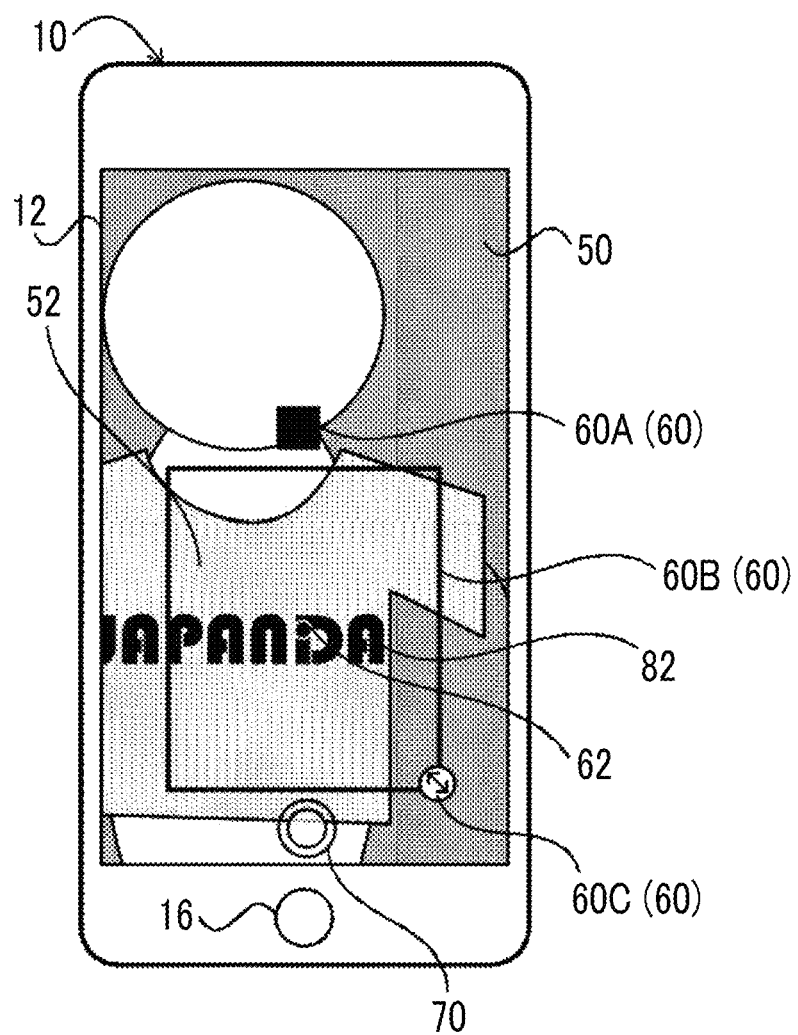
FIG. 24B is a diagram for describing Modification Example 4.

The shape of the indicator 60A is also not particularly limited. In each form above, a case where the shape of the indicator 60A is a circular shape is described. Alternatively, for example, as illustrated in FIG. 24B, the shape of the indicator 60A may be a rectangular shape. In addition, the shape of the indicator 60A and the shape of the color designation mark 62 may be set to the same shape, or the shape of the indicator 60A and the shape of the specifying frame 60B may be set to the same shape.

Modification Example 5

In the present modification example, a modification example of the color designation mark 62 will be described. A form in which the color designation mark 62 is a mark having a shape of a circular ring surrounding the display image 50 is described above. However, the shape of the color designation mark 62 is not limited to a circular ring.

Figure 25A:
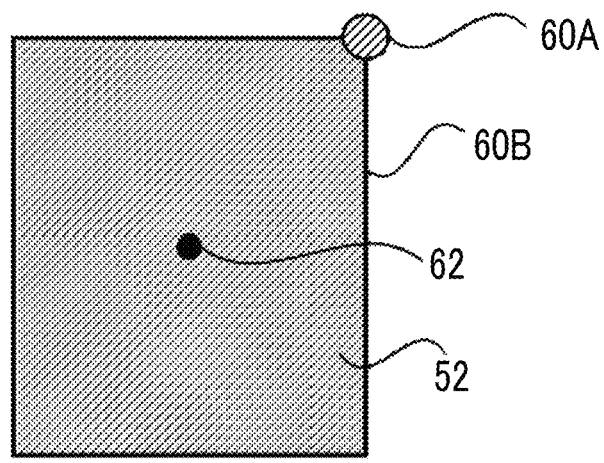
FIG. 25A is a diagram for describing Modification Example 5.

For example, as illustrated in FIG. 25A, the shape of the color designation mark 62 may be a circle or an image of a so-called filled circle. In this case, the color of the display image 50 in a part on which the color designation mark 62 is superposed is designated as the reference color.

Figure 25B:
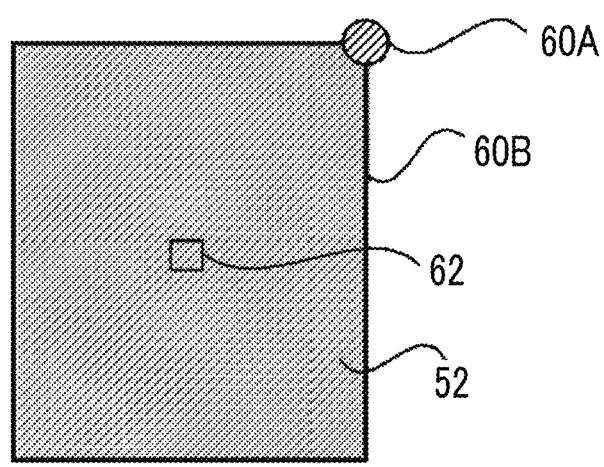
FIG. 25B is a diagram for describing Modification Example 5.

In addition, for example, as illustrated in FIG. 25B, the shape of the color designation mark 62 may be a rectangular shape. In addition, for example, the shape of the color designation mark 62 and the shape of the specifying frame 60B may be set to the same shape.

Modification Example 6

While a form in which the display image 50 and the selection image 56 are live view images of which the live view display can be performed is described above, at least one of the display image 50 or the selection image 56 may not be a live view image. That is, at least one of the display image 50 or the selection image 56 may be an image read out from captured images (hereinafter, referred to as storage images) that are captured in the past and stored in the memory card 29, the user region 28 of the storage device 18, or the like.

Figure 26A:
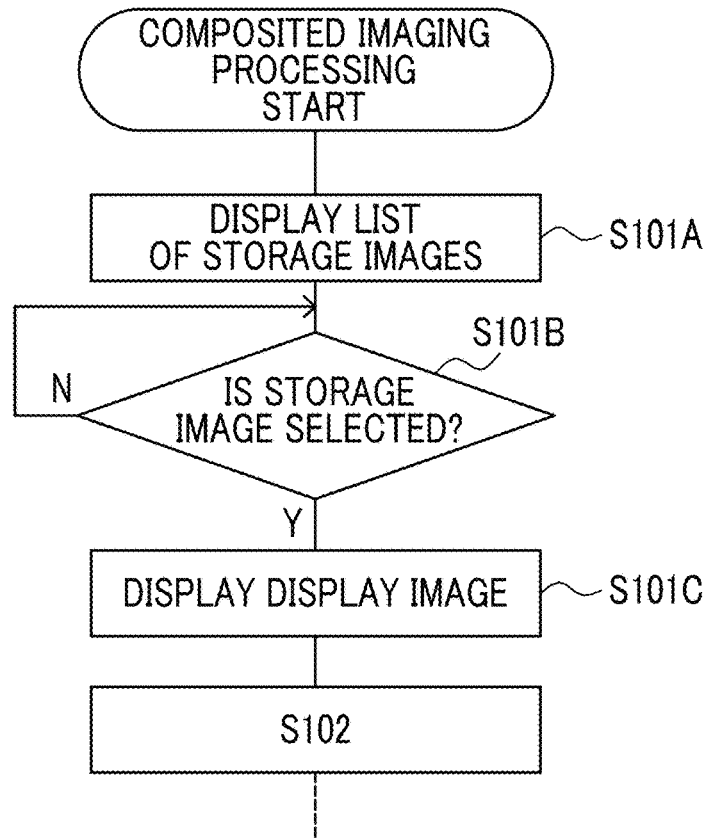
FIG. 26A is a flowchart illustrating one example of composited imaging processing of Modification Example 6.

First, a case where the display image 50 is not a live view image and is a storage image will be described. FIG. 26A illustrates a flowchart of composited imaging processing in a case where the display image 50 is a storage image. The composited imaging processing illustrated in FIG. 26A includes processing of steps S101A to S101C instead of step S100 of the composited imaging processing illustrated in FIG. 6.

In step S101A, the display control unit 31 creates a list of stored storage images and displays the list on the touch panel display 12. Examples of the list of storage images include a form of linearly displaying thumbnail images or the like of the storage images.

The user U refers to the list of storage images and provides an operation instruction for selecting a storage image in which the image desired to be set as the compositing target image 54 is included. As one example, in the present modification example, the operation instruction provided by the user U for selecting the storage image is provided by allowing the user to touch the thumbnail image or the like of the storage image displayed on the touch panel display 12 using one finger. In a case where the main control unit 26 receives the operation instruction for selecting the storage image, the main control unit 26 outputs information about the present operation instruction to the display control unit 31.

Next, in step S101B, the display control unit 31 determines whether or not the storage image is selected by the user. The determination in step S101B results in a negative determination until the information about the operation instruction for selecting the storage image is input from the main control unit 26. In a case where the information about the operation instruction for selecting the storage image is input from the main control unit 26, the determination in step S101B results in a positive determination, and a transition is made to step S101C.

In step S101C, the display control unit 31 displays one storage image corresponding to the information about the operation instruction on the touch panel display 12 as the display image 50 from the stored storage images.

Processing of step S102 and later is the same as the above form. In the case of the present example, the storage image is read out from the memory card 29 or the user region 28 as the display image 50 under control of the main control unit 26. The display image 50 which is read out is recorded in the image memory 17A. The display image 50 read out from the memory card 29 or the user region 28 is in a compressed form. The image processing unit 32 reads out the display image 50 from the image memory 17A and performs decompression processing on the display image 50. The extraction unit 32A extracts the compositing target image 54 from the display image 50 subjected to the decompression processing.

Figure 26B:
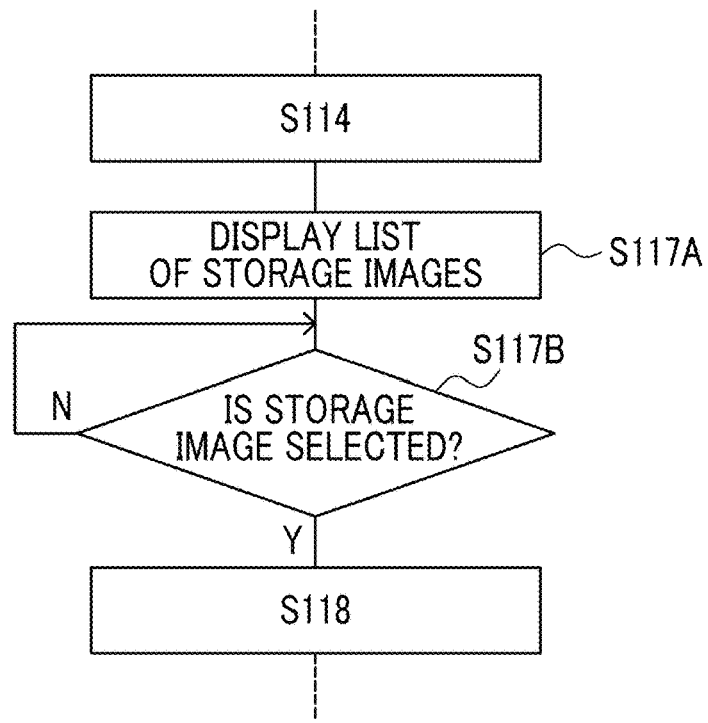
FIG. 26B is a flowchart illustrating one example of the composited imaging processing of Modification Example 6.

Next, a case where the selection image 56 is not a live view image and is a storage image will be described. FIG. 26B illustrates a flowchart of composited imaging processing in a case where the selection image 56 is a storage image. The composited imaging processing illustrated in FIG. 26B includes processing of steps S117A and S117B instead of step S116 of the composited imaging processing illustrated in FIG. 6.

In step S117A, the display control unit 31 creates a list of stored storage images and displays the list on the touch panel display 12 in the same manner as step S101A.

The user U refers to the list of storage images and provides an operation instruction for selecting the storage image desired to be set as the selection image 56 in the same manner as the operation instruction for selecting the storage image desired to be set as the compositing target image 54 from the list of storage images described above. In a case where the main control unit 26 receives the operation instruction for selecting the storage image, the main control unit 26 outputs information about the present operation instruction to the display control unit 31.

Next, in step S117B, the display control unit 31 determines whether or not the storage image is selected by the user in the same manner as step S101B. The determination in step S117B results in a negative determination until the information about the operation instruction for selecting the storage image is input from the main control unit 26. In a case where the information about the operation instruction for selecting the storage image is input from the main control unit 26, the determination in step S117B results in a positive determination, and a transition is made to step S118.

Processing of step S118 and later is the same as the above form. In the case of the present example, one storage image corresponding to the information about the operation instruction is read out from the storage images stored in the memory card 29 or the user region 28 as the selection image 56 under control of the main control unit 26. The selection image 56 which is read out is recorded in the image memory 17A. The selection image 56 read out from the memory card 29 or the user region 28 is in a compressed form. The image processing unit 32 reads out the selection image 56 from the image memory 17A and performs the decompression processing on the selection image 56. The compositing unit 32B composites the compositing target image 54 in the selection image 56 subjected to the decompression processing.

In a case where the display image 50 and the selection image 56 are not live view images and are storage images, the composited imaging processing illustrated in FIG. 26A and the composited imaging processing illustrated in FIG. 26B may be combined.

In a case where the captured image in the past can be used as the display image 50, for example, the user U can have the joy of obtaining a composite photograph of a subject and a mark or a character string recalled from the subject in a case where the user U recalls the mark or the character string captured in the captured image captured in the past based on the subject found by the user U at a traveling destination. Conversely, for example, the user U can have the joy of obtaining a composite photograph of a mark or a character string of the current subject and a captured image recalled from the subject in a case where the user U recalls the captured image captured in the past based on the subject of the mark or the character string found by the user U at the traveling destination.

The composite image recorded in the memory card 29 or the user region 28 by performing the composited imaging may be used as at least one of the display image 50 or the selection image 56. By doing so, compositing can be performed a plurality of times. Thus, the joy is further expanded.

As at least one of the display image 50 or the selection image 56, not only the storage image stored in the memory card 29 or the user region 28 but also an image downloaded from a server through the Internet or the like may be used as at least one of the display image 50 or the selection image 56. Even in the case of downloading the image from the server, the image is temporarily recorded in the memory card 29 or the user region 28. Thus, subsequent processing is the same as in the case of using the storage image as at least one of the display image 50 or the selection image 56 from the memory card 29 or the user region 28.

As described above, in the portable terminal 10 of each form above, a desired composite image of the user U can be generated by designating the color of the image desired to be extracted from the specified region 52, that is, the image desired to be set as the compositing target image 54, as the reference color by the color designation mark 62 in the specifying frame 60B. Accordingly, according to the portable terminal 10 of each form above, creation of the composite image is facilitated, and the operability of the user U related to compositing is improved.

In the technology of the present disclosure, each form above can be subjected to various modifications without departing from the gist of the present invention. For example, in extraction of the compositing target image 54 from the display image 50, the subject in which the compositing target image 54 is displayed may be a curved object having a cylindrical shape or the like. In such a case, a form in which the extraction unit 32A performs leveling processing of leveling a curved surface on the compositing target image 54 extracted from the specified region 52 may be available. Such leveling processing may be performed based on an operation instruction provided by the user U or may be automatically performed by the extraction unit 32A by determining the shape of the subject.

In each form above, the portable terminal 10 such as a smartphone is illustratively described as one example of the imaging apparatus. Alternatively, the imaging apparatus may be other than the smartphone and, for example, may be a tablet terminal or an ordinary digital camera which is a dedicated camera apparatus.

An apparatus in which the image processing apparatus according to the present disclosure is incorporated is not limited to the portable terminal 10. For example, a form of incorporation into a general-purpose personal computer or the like may be available, and a form of incorporation into an apparatus not having an imaging function may be available. In the case of incorporation into the apparatus not having the imaging function, the apparatus does not have a live view display function. Thus, both of the display image 50 and the selection image 56 are images which are not live view images, that is, still images.

The image processing program illustrated as the photograph compositing application program as one example may be preinstalled on the storage device 18 when the portable terminal 10 is sold. Alternatively, after the user purchases the portable terminal 10, the user may access the server using the portable terminal 10 and download and install an operation program from the server.

Processing of the composited imaging mode executed by the portable terminal 10 according to the present disclosure is merely one example. Accordingly, removal of unnecessary steps, addition of new steps, or change of the processing order may be available without departing from the gist.

In the embodiment, a combination of a plurality of steps of the composited imaging mode illustrated in FIG. 6 as one example corresponds to one example of an image processing method according to the present disclosure.

In the embodiment, the following various processors can be used as the hardware structure of processing units such as the main control unit, the extraction unit, the compositing unit, and the display control unit executing various types of processing. The various processors include a CPU that is a general-purpose processor functioning as various processing units by executing software (program) and also a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute a specific type of processing, and the like.

The various types of processing may be executed by one of the various processors or may be executed by a combination of two or more processors of the same kind or different kinds (for example, a plurality of FPGAs and a combination of a CPU and an FPGA). Alternatively, a plurality of processing units may be configured with one processor. An example of configuring the plurality of processing units with one processor is a form of using a processor such as a system on chip (SOC) that implements the function of the entire system including the plurality of processing units using one integrated circuit (IC) chip.

Accordingly, various processing units are configured using one or more of the various processors as the hardware structure.

Furthermore, more specifically, an electric circuit (circuitry) in which circuit elements such as semiconductor elements are combined can be used as the hardware structure of the various processors.

The technology of the present disclosure is applied to not only the operation program of the imaging apparatus but also a non-transitory computer readable storage medium (a USB memory, a digital versatile disc (DVD)-read only memory (ROM), or the like) storing the operation program of the imaging apparatus.

What is claimed is:

1. An image processing apparatus comprising:
a display that is configured to display a display image;
an input device that is configured to receive input; and
a processor that is configured to:
display, on the display, at a location within the display image and of a size specified via the input device, a specifying frame which specifies a partial region of the display image within the specifying frame and a color designation mark included in the specifying frame with which a reference color is designated from colors included in the partial region of the display image within the specifying frame, wherein the specifying frame and color designation mark are overlaid with the display image; and
extract an image corresponding to the reference color designated by the color designation mark from the partial region of the display image within the specifying frame, as a compositing target image.

2. The image processing apparatus according to claim 1, a relative positional relationship between the specifying frame and the color designation mark is predetermined.

3. The image processing apparatus according to claim 1, wherein the processor is further configured to:
receive a size change instruction for enlarging or reducing the specifying frame, and
perform control for changing the size of the specifying frame in accordance with the size change instruction.

4. The image processing apparatus according to claim 1, wherein the processor is further configured to:
receive a movement instruction for moving a position of the specifying frame, and
perform control for moving the position of the specifying frame in accordance with the movement instruction.

5. The image processing apparatus according to claim 1, wherein a color of the display image in a part on which the color designation mark is overlaid is set as the reference color.

6. The image processing apparatus according to claim 5, wherein the processor is further configured to:
display an indicator that has a larger area than the color designation mark and that represents the reference color.

7. The image processing apparatus according to claim 1, wherein the color designation mark has a shape surrounding a part of the display image, and
the processor is further configured to set a color of the display image surrounded by the color designation mark, as the reference color.

8. The image processing apparatus according to claim 7, wherein the processor is further configured to:
display an indicator that has a larger area than a region of the display image surrounded by the color designation mark and that represents the reference color.

9. The image processing apparatus according to claim 1, wherein the processor is further configured to:
quantify gradation of an entire image in the specifying frame and extract an image in which a numerical value of gradation is within a reference color range including a numerical value of gradation to which the reference color corresponds, as the compositing target image.

10. The image processing apparatus according to claim 9, wherein the processor is further configured to:
receive an input from the input device to set the reference color range.

11. An imaging apparatus comprising:
an imaging device that images a subject; and
the image processing apparatus according to claim 1, wherein the display displays an image of the subject captured by the imaging device.

12. The imaging apparatus according to claim 11, wherein live view display of a display image is performed on the display.

13. The image processing apparatus according to claim 1, wherein the processor is further configured to generate a composite image in which the compositing target image is composited in a selection image selected via the input device.

14. The image processing apparatus according to claim 1, wherein the specifying frame is configured to be resizable and movable via the input device within the display image to specify the partial region in the display image of the specified location and the size.

15. The image processing apparatus according to claim 1, wherein
the color designation mark is configured to move when the specifying frame is resized or moved while keeping a predetermined relative positional relationship between the specifying frame and the color designation mark.

16. An image processing method executed by a computer, comprising:
displaying, on a display, at a location within a display image and of a size specified via an input device, a specifying frame which specifies a partial region of the display image within the specifying frame and a color designation mark included in the specifying frame with which a reference color is designated from colors included in the partial region of the display image within the specifying frame, wherein the specifying frame and color designation mark are overlaid with the display image; and
extracting an image corresponding to the reference color designated by the color designation mark from the partial region of the display image within the specifying frame, as a compositing target image.

17. A non-transitory computer-readable storage medium storing an image processing program causing a computer to execute a process, the process comprising:
displaying, on a display, at a location within a display image and of a size specified via an input device, a specifying frame which specifies a partial region of the display image within the specifying frame and a color designation mark included in the specifying frame with which a reference color is designated from colors included in the partial region of the display image within the specifying frame, wherein the specifying frame and color designation mark are overlaid with the display image; and
extracting an image corresponding to the reference color designated by the color designation mark from the partial region of the display image within the specifying frame, as a compositing target image.

* * * * *